US012634388B2

(12) United States Patent
Mattison et al.

(10) Patent No.: US 12,634,388 B2
(45) Date of Patent: May 19, 2026

(54) GRIPPING ATTACHMENT APPARATUS

(71) Applicant: The Gripper Shop, LLC, Sebring, FL (US)

(72) Inventors: Jennifer Eileen Mattison, Sebring, FL (US); Michael Brian Mattison, Sebring, FL (US)

( * ) Notice: Subject to any disclaimer, the term of this patent is extended or adjusted under 35 U.S.C. 154(b) by 271 days.

(21) Appl. No.: 18/239,593

(22) Filed: Aug. 29, 2023

(65) Prior Publication Data

US 2024/0179232 A1 May 30, 2024

Related U.S. Application Data

(60) Provisional application No. 63/402,044, filed on Aug. 29, 2022, provisional application No. 63/424,715, filed on Nov. 11, 2022.

(51) Int. Cl.
*G06F 1/16* (2006.01)
*B25G 1/10* (2006.01)
*H04M 1/02* (2006.01)

(52) U.S. Cl.
CPC ................................. *H04M 1/0279* (2013.01)

(58) Field of Classification Search
None
See application file for complete search history.

(56) References Cited

U.S. PATENT DOCUMENTS

| | | | | |
|---|---|---|---|---|
| 5,546,832 A | * | 8/1996 | Townsend | ................ B25D 1/00 81/20 |
| 8,385,974 B1 | | 2/2013 | Bishop | |

| | | | | |
|---|---|---|---|---|
| 9,259,829 B1 | * | 2/2016 | Cougar | .................. B25G 1/102 |
| 10,561,228 B2 | | 2/2020 | Britt et al. | |
| D892,787 S | | 8/2020 | Chen | |
| 11,021,182 B1 | | 6/2021 | DeGrazia | |
| 2012/0043452 A1 | | 2/2012 | Karmatz | |
| 2012/0048873 A1 | | 3/2012 | Hyseni | |
| 2012/0187706 A1 | | 7/2012 | Kannaka | |
| 2012/0326003 A1 | | 12/2012 | Solow et al. | |
| 2015/0239136 A1 | * | 8/2015 | Taylor | ...................... B26B 1/10 29/426.2 |
| 2017/0241590 A1 | * | 8/2017 | Boubli | .................. G06F 1/1632 |
| 2019/0075197 A1 | * | 3/2019 | Roncetti | ................ H04B 1/385 |
| 2021/0028809 A1 | * | 1/2021 | Altschul | ............. H04B 1/3888 |
| 2022/0118599 A1 | * | 4/2022 | Posnak | .................. B25G 1/102 |

FOREIGN PATENT DOCUMENTS

| | | | | | |
|---|---|---|---|---|---|
| CN | 112333306 A | * | 2/2021 | ............. | H04M 1/23 |
| CN | 213425809 U | * | 6/2021 | | |
| CN | 214315348 U | * | 9/2021 | | |
| CN | 216356810 U | * | 4/2022 | | |
| KR | 101357009 B1 | | 2/2014 | | |
| KR | 20170138329 A | | 12/2017 | | |
| TW | 201541928 A | * | 11/2015 | .......... | G06F 1/1686 |

* cited by examiner

*Primary Examiner* — Mohammed Rachedine

(57) ABSTRACT

An apparatus is provided for receiving an item having an attachment surface. The apparatus comprises an elongated main body, an attachment socket, and a plurality of grooves. The attachment socket is formed on the elongated main body. The plurality of grooves is formed on the elongated main body. The attachment socket and the plurality of grooves are located opposite to each other about the elongated main body. The attachment socket is configured to releasably receive the attachment surface.

20 Claims, 21 Drawing Sheets

1400

GRIPPING ATTACHMENT APPARATUS

CROSS REFERENCE TO RELATED REFERENCE

The present application claims priority benefit from U.S. Provisional Application No. 63/402,044, filed Aug. 29, 2022, and U.S. Provisional Application No. 63/424,715, filed Nov. 11, 2022. The present application incorporates the entirety of both of the foregoing disclosures herein by reference.

FIELD OF THE INVENTION

The present invention relates generally to a gripping attachment apparatus for gripping an item, and more particularly, an item having an edge, such as to a gripping attachment apparatus for gripping a handheld electronic device with or without an external device case surrounding the handheld electronic device and a gripping attachment apparatus for gripping a rod, such as the handle of a broom, mop, or the handle of a shopping cart.

BACKGROUND OF THE INVENTION

There is a continuing need for a gripping apparatus that provides comfort and better gripping function for a user to grip an item. There is a further need for a gripping apparatus that not only provides comfort and better gripping function but provides an insulation function between an item and the user's grip. There is a still further need for a gripping apparatus that is removable from an item so that it can be used with multiple items and so that it can be independently cleaned between uses.

By way of example, a mobile device (or handheld computer) is a computer small enough to hold and operate in the hand. Typically, any handheld computer device will have an LCD or OLED flat-screen interface, providing a touchscreen interface with digital buttons and a keyboard or physical buttons along with a physical keyboard. Many such devices can connect to the Internet and interconnect with other devices such as car entertainment systems or headsets via Wi-Fi, Bluetooth, cellular networks, or near-field communication (NFC). Integrated cameras, the ability to place and receive voice and video telephone calls, video games, and Global Positioning System (GPS) capabilities are common. Power is typically provided by a lithium-ion battery. Mobile devices may run mobile operating systems that allow third-party applications to be installed and run.

Early smartphones were joined in the late 2000s by larger, but otherwise essentially the same, tablets. Input and output are usually via a touch-screen interface. Phones/tablets and personal digital assistants may provide much of the functionality of a laptop/desktop computer but more conveniently, in addition to exclusive features. Enterprise digital assistants can provide additional business functionality such as integrated data capture via barcode, RFID, and smart card readers.

By 2010, mobile devices often contained sensors such as accelerometers, magnetometers, and gyroscopes, allowing detection of orientation and motion. Mobile devices may provide biometric user authentication, such as face recognition or fingerprint recognition.

There are many kinds of mobile devices, designed for different applications. They include:
Mobile computers (Tablet computer, Netbook, Digital media player, Enterprise digital assistant, Graphing calculator, Handheld game console, Handheld PC, Laptop, Mobile Internet device (MID), Personal digital assistant (PDA), Pocket calculator, Portable media player, Ultra-mobile PC);
Mobile phones (Camera phones, Feature phones, Smartphones, Phablets);
Digital cameras (Digital camcorder, Digital still camera (DSC), Digital video camera (DVC), Front-facing camera);
Pagers;
Personal navigation device (PND);
Wearable computers (Calculator watch, Smartwatch, Head-mounted display);
Smart cards.

Mobile accessories include any hardware that is not integral to the operation of a mobile smartphone as designed by the manufacturer. Cases, which are designed to attach to, support, or otherwise hold a smartphone, are popular accessories. Case measures are based on the display inches (e.g. 5-inch display). There are different types:
Pouches and sleeves;
Holsters; Shells;
Skins;
Fitted cases;
Bumpers,
Flip cases and wallets;
Screen protection and body films;
Drop and shock protection;
Leather case;
Cases with integrated kickstands;
Battery cases.

However, current mobile phones or phone cases do not provide a comfort and a better gripping function for a user to grip them. Similarly other items, and more particularly, an item having an edge, such as a handheld electronic device with or without an external device case surrounding the handheld electronic device and a rod, such as the handle of a broom, mop, or the handle of a shopping cart do not provide a comfort and better gripping function for a user to grip them.

Accordingly, there is a need for a solution to at least one of the aforementioned problems.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Now in accordance with the present invention, there has been found an apparatus that provides a comfort and a better gripping function for a user to grip an item. Further, now in accordance with the present invention, there has been found an apparatus that provides an insulation function between an item and the finger grip. Still further, now in accordance with the present invention, there has been found an apparatus that is removable from an item so apparatus can be used with multiple items and so that the apparatus can be independently cleaned between uses. The apparatus according to the invention present invention provides for these and related Implementations of the present invention include a gripping attachment apparatus for gripping an item having an attachment surface, the gripping attachment apparatus has an elongated main body; an attachment socket; a plurality of gripping grooves; the attachment socket being formed on the elongated main body; the plurality of gripping grooves being formed on the elongated main body; the attachment socket and the plurality of gripping grooves being located opposite to each other about the elongated main body; the attachment socket being configured to receive the attachment surface; and the plurality of gripping grooves being configured to receive fingers of a left hand or a right hand of a user.

According to an aspect of the present invention, the attachment socket may be configured to releasably receive the attachment surface.

According to an aspect of the present invention, the attachment socket may be configured to releasably receive the attachment device using a slide fit, a friction fit, or a snap-fit snap fit.

According to an aspect of the present invention, a cross-section of the attachment socket may have a tear shape, a semi-circle shape, a tunnel shape, or three sides of a square or rectangle.

According to an aspect of the present invention, the attachment socket may be configured to receive an edge attachment surface or a rod attachment surface.

According to an aspect of the present invention, the attachment socket may be configured to receive the hand-held electronic device or may be configured to receive the external device case surrounding the handheld electronic device, an edge of the computer, the edge of a bag, utensils, an edge of a dish, an edge of a pot or an edge of a pan.

According to an aspect of the present invention, the rod is the handle of a shopping cart, the handle of a broom, the handle of a mop, or the rod portion of a weight set.

According to an aspect of the present invention, the elongated main body may be made of a phosphorescent silicone material.

According to an aspect of the present invention, the elongated body has two opposing ends and the opposing ends independently have a straight, curved, or chamfered shape.

Implementations of the present invention include a gripping attachment apparatus for a handheld electronic device with or without an external device case surrounding the handheld electronic device, the gripping attachment apparatus has an elongated main body; an attachment socket; a plurality of gripping grooves; the attachment socket being formed on the elongated main body; the plurality of gripping grooves being formed on the elongated main body; the attachment socket and the plurality of gripping grooves being located opposite to each other about the elongated main body; the attachment socket being configured to slidably receive the handheld electronic device or the external device case surrounding the handheld electronic device; and the plurality of gripping grooves being configured to receive fingers of a left hand or a right hand of a user.

According to an aspect of the present invention, the attachment socket may be configured to releasably receive the attachment surface.

According to an aspect of the present invention, the attachment socket may be configured to releasably receive the attachment device using a slide fit, a friction fit, or a snap fit.

According to an aspect of the present invention, a cross-section of the attachment socket may have a tear shape, a semi-circle shape, a tunnel shape, or three sides of a square or rectangle.

According to an aspect of the present invention, the attachment socket may be configured to receive an edge attachment surface or a rod attachment surface.

According to an aspect of the present invention, the attachment socket may be configured to receive the hand-held electronic device or may be configured to receive the external device case surrounding the handheld electronic device, an edge of the computer, the edge of a bag, utensils, an edge of a dish, an edge of a pot or an edge of a pan.

According to an aspect of the present invention, the rod is the handle of a shopping cart, the handle of a broom, the handle of a mop, or the rod portion of a weight set.

According to an aspect of the present invention, the elongated main body may be made of a phosphorescent silicone material.

According to an aspect of the present invention, the elongated body has two opposing ends and the opposing ends independently have a straight, curved, or chamfered shape.

According to an aspect of the present invention, the apparatus may be a gripping attachment apparatus.

According to an aspect of the present invention, the gripping attachment apparatus may be for a handheld electronic device with or without an external device case surrounding the handheld electronic device.

According to an aspect of the present invention, the attachment apparatus may comprise an elongated main body.

According to an aspect of the present invention, the elongated main body may be made of a material that enables the glow-in-the-dark function of the gripping attachment apparatus. For example, the elongated main body may be made of a phosphorescent silicone material that activates in darkness.

According to an aspect of the present invention, the attachment apparatus may comprise an attachment socket.

According to an aspect of the present invention, the attachment socket may be formed on the elongated main body.

According to an aspect of the present invention, the gripping attachment apparatus may comprise a plurality of gripping grooves.

According to an aspect of the present invention, the plurality of gripping grooves may be formed on the elongated main body.

According to an aspect of the present invention, the plurality of gripping grooves may be configured to receive the fingers of a user.

According to an aspect of the present invention, the plurality of gripping grooves may be molded into the shapes of fingers.

Implementations of the present invention include an elongated main body; an attachment socket; a plurality of grooves; the attachment socket being formed on the elongated main body; the plurality of grooves being formed on the elongated main body; the attachment socket and the plurality of grooves being located opposite to each other about the elongated main body; and the attachment socket being configured to receive the attachment surface.

According to an aspect of the present invention, the attachment socket may be configured to releasably receive the attachment surface.

Both the foregoing summary and the following detailed description provide examples and are explanatory only. Accordingly, the foregoing summary and the following detailed description should not be considered to be restrictive. Further, features or variations may be provided in addition to those set forth herein. For example, aspects may be directed to various feature combinations and sub-combinations described in the detailed description.

These and other objects, features, and advantages of the present invention will become more readily apparent from the attached drawings and the detailed description of the preferred aspects, which follow.

BRIEF DESCRIPTION OF THE DRAWINGS

The accompanying drawings, which are incorporated in and constitute a part of this disclosure, illustrate various aspects of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with the reproduction of the granted patent and for no other purpose.

Furthermore, the drawings may contain text or captions that may explain certain aspects of the present disclosure. This text is included for illustrative, non-limiting, explanatory purposes of certain aspects detailed in the present disclosure.

The preferred aspects of the invention will hereinafter be described in conjunction with the appended drawings provided to illustrate and not to limit the invention, where like designations denote like elements, and in which:

Figure 1:
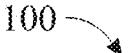
Figure 1:
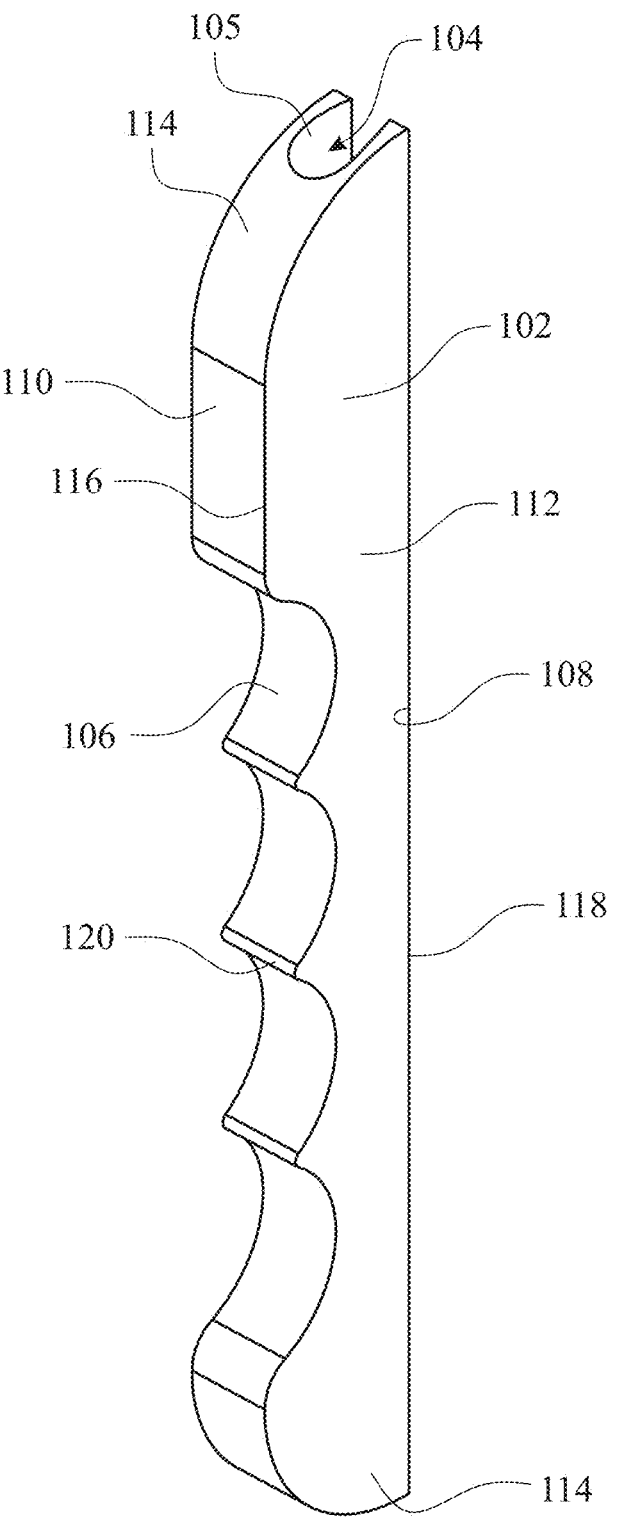
Figure 2:
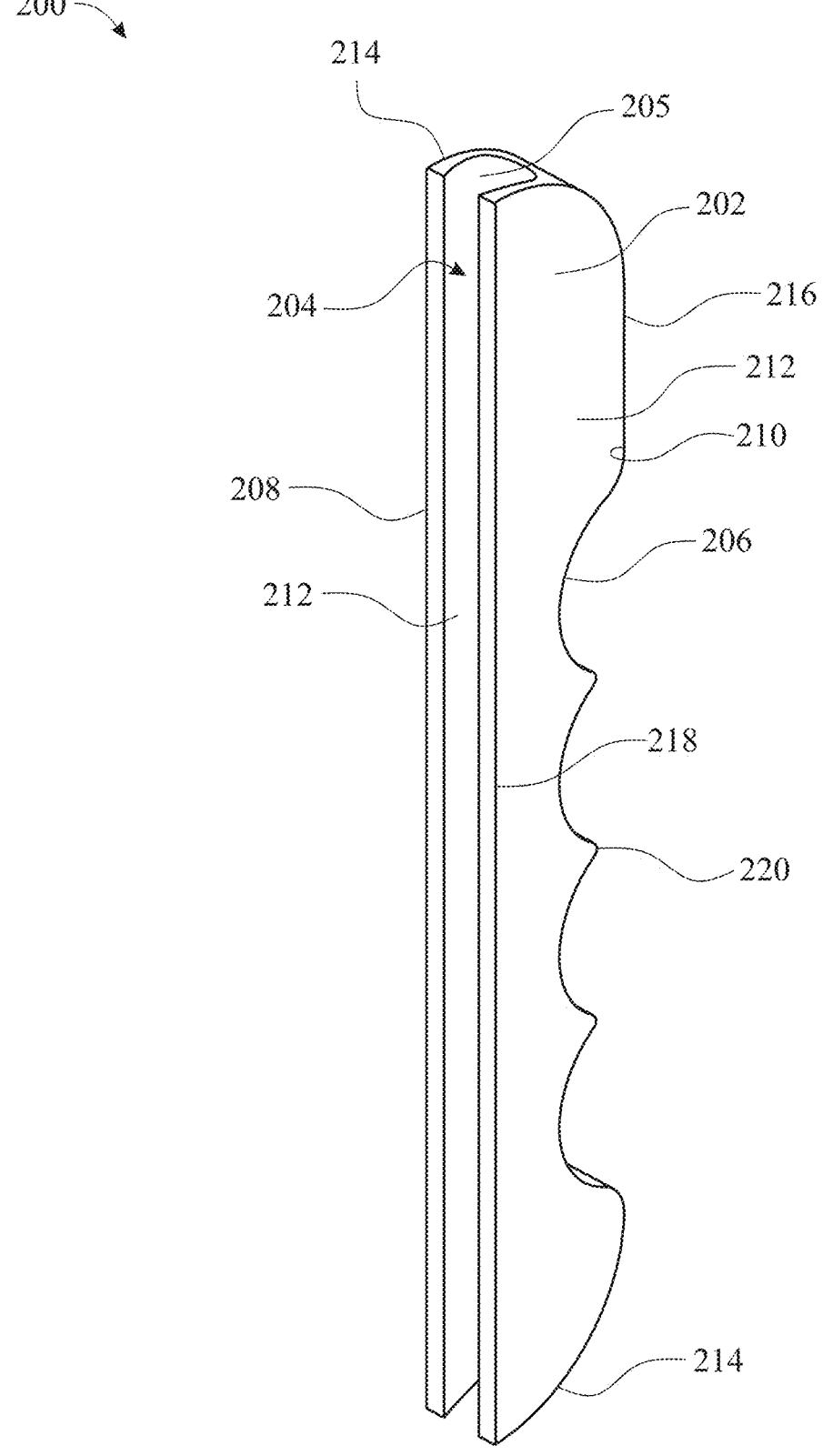
Figure 3:
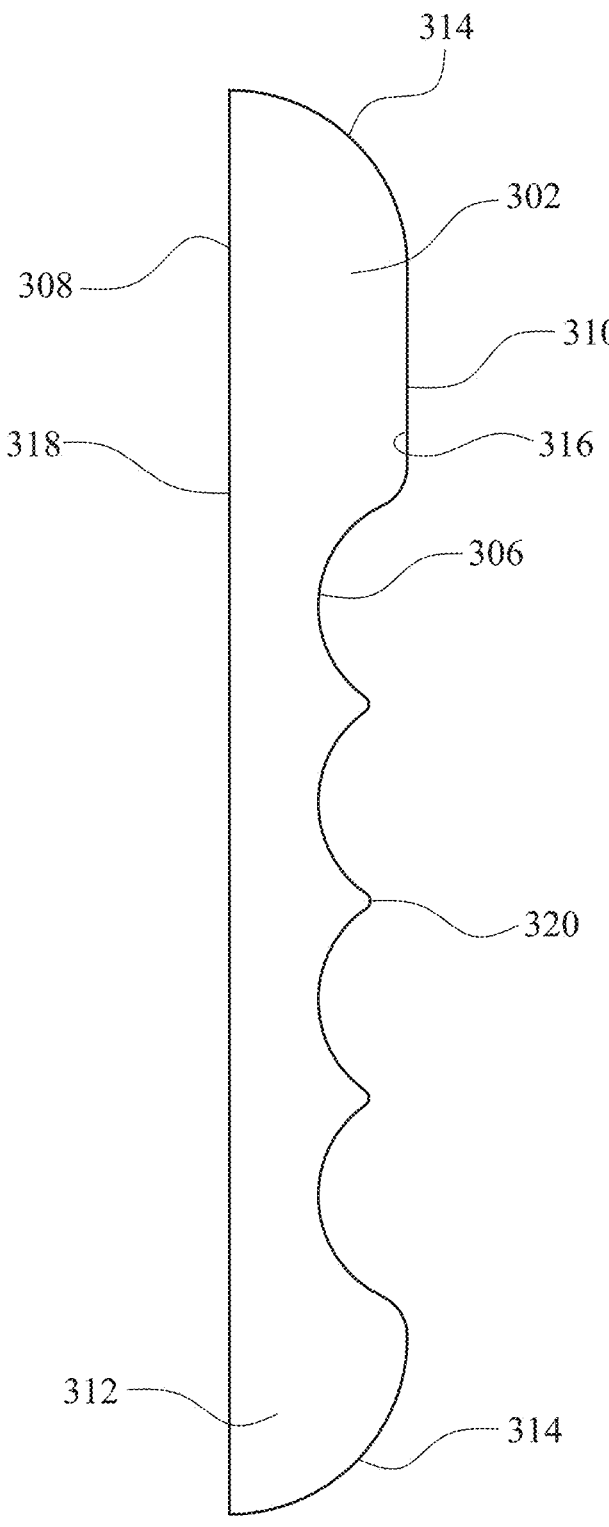
Figure 4:
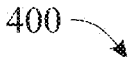
Figure 4:
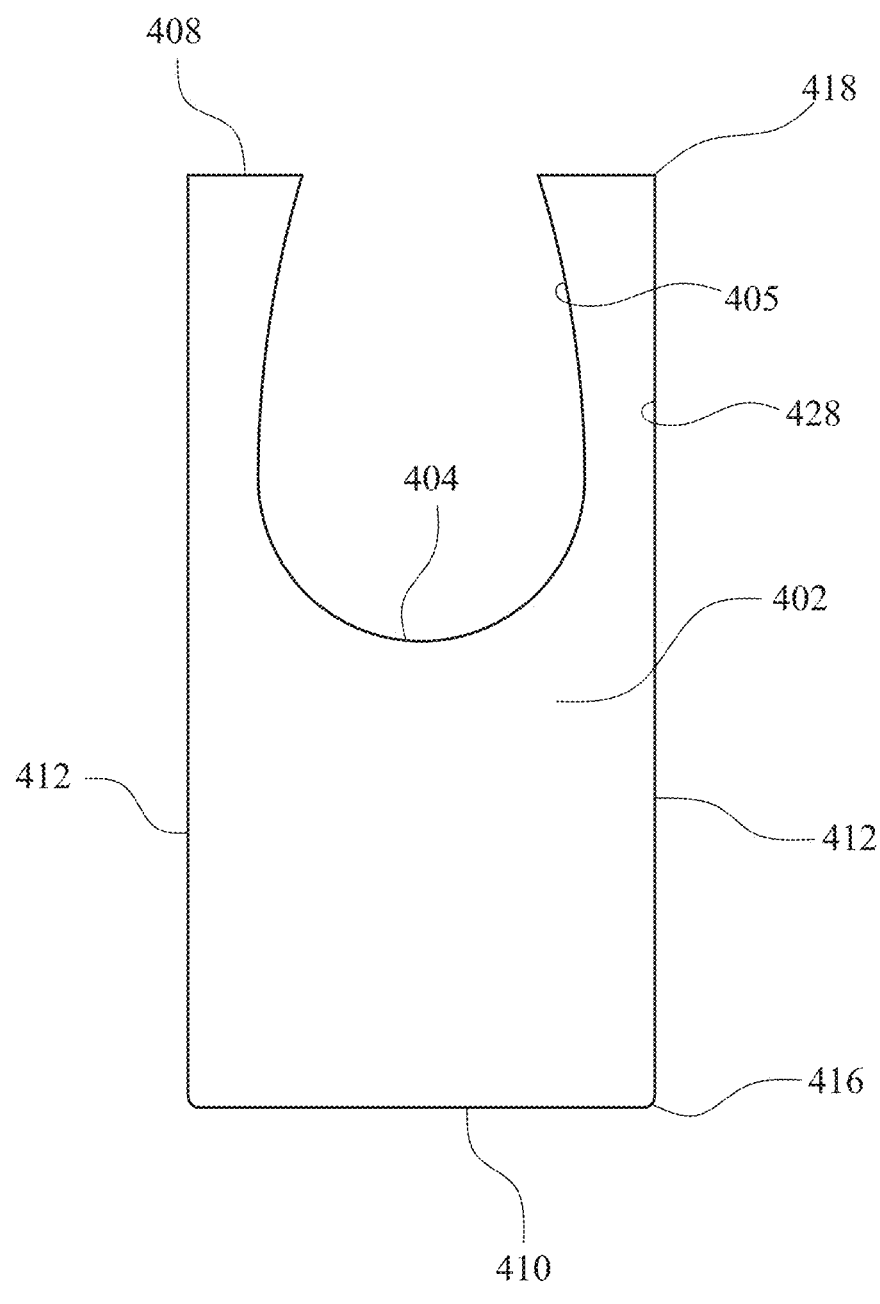
Figure 5:
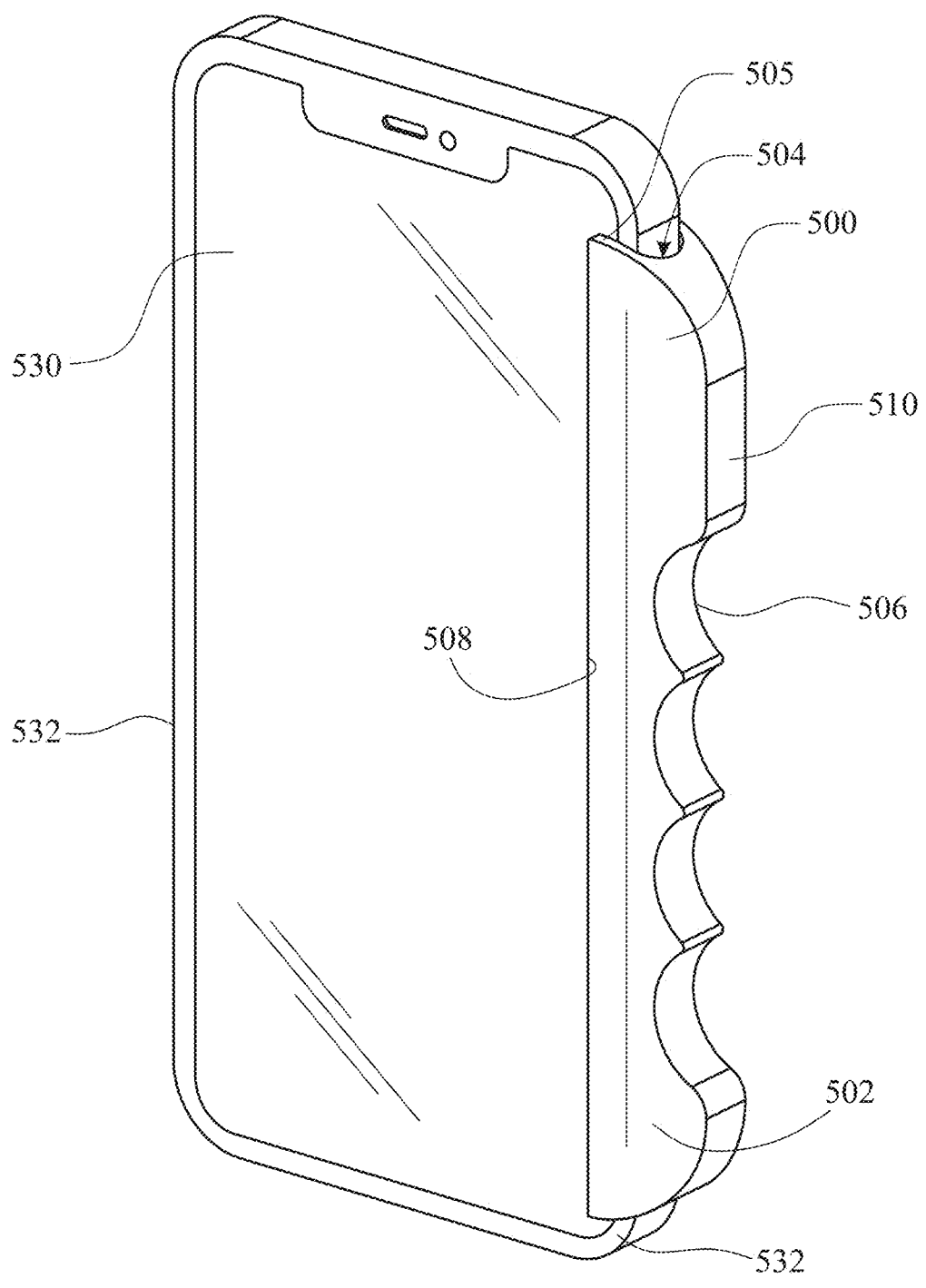
Figure 6:
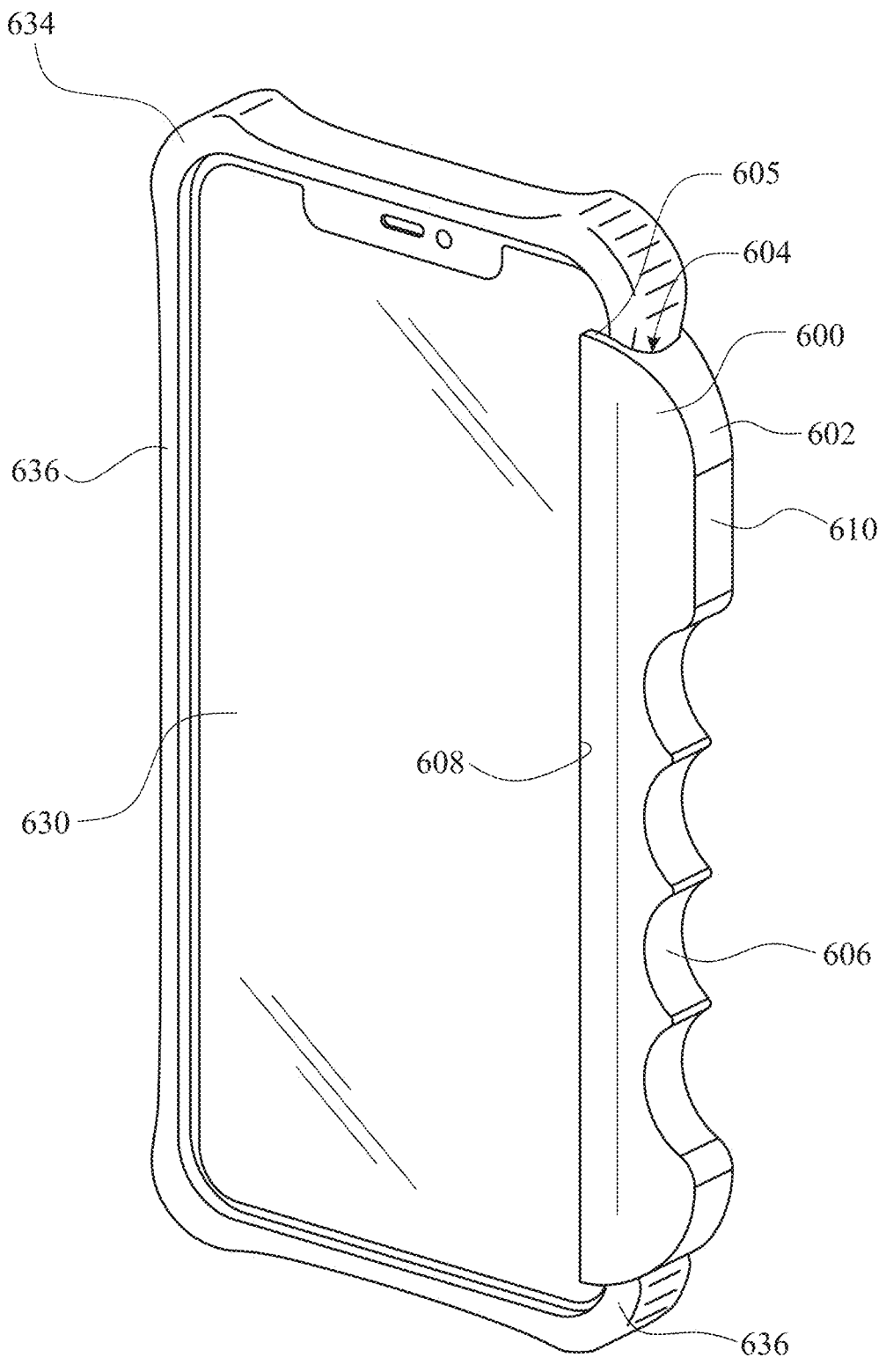
Figure 7:
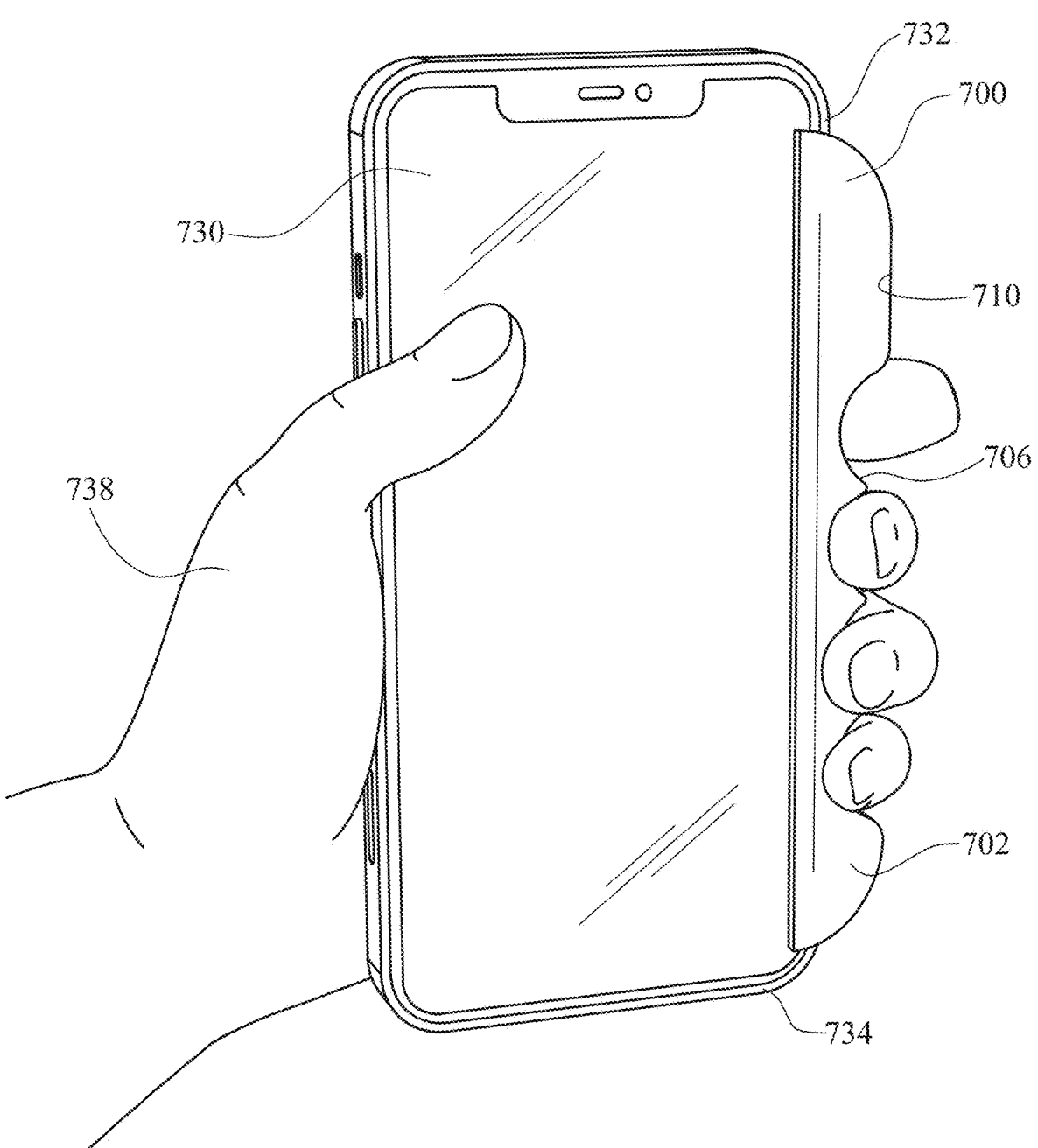
Figure 8:
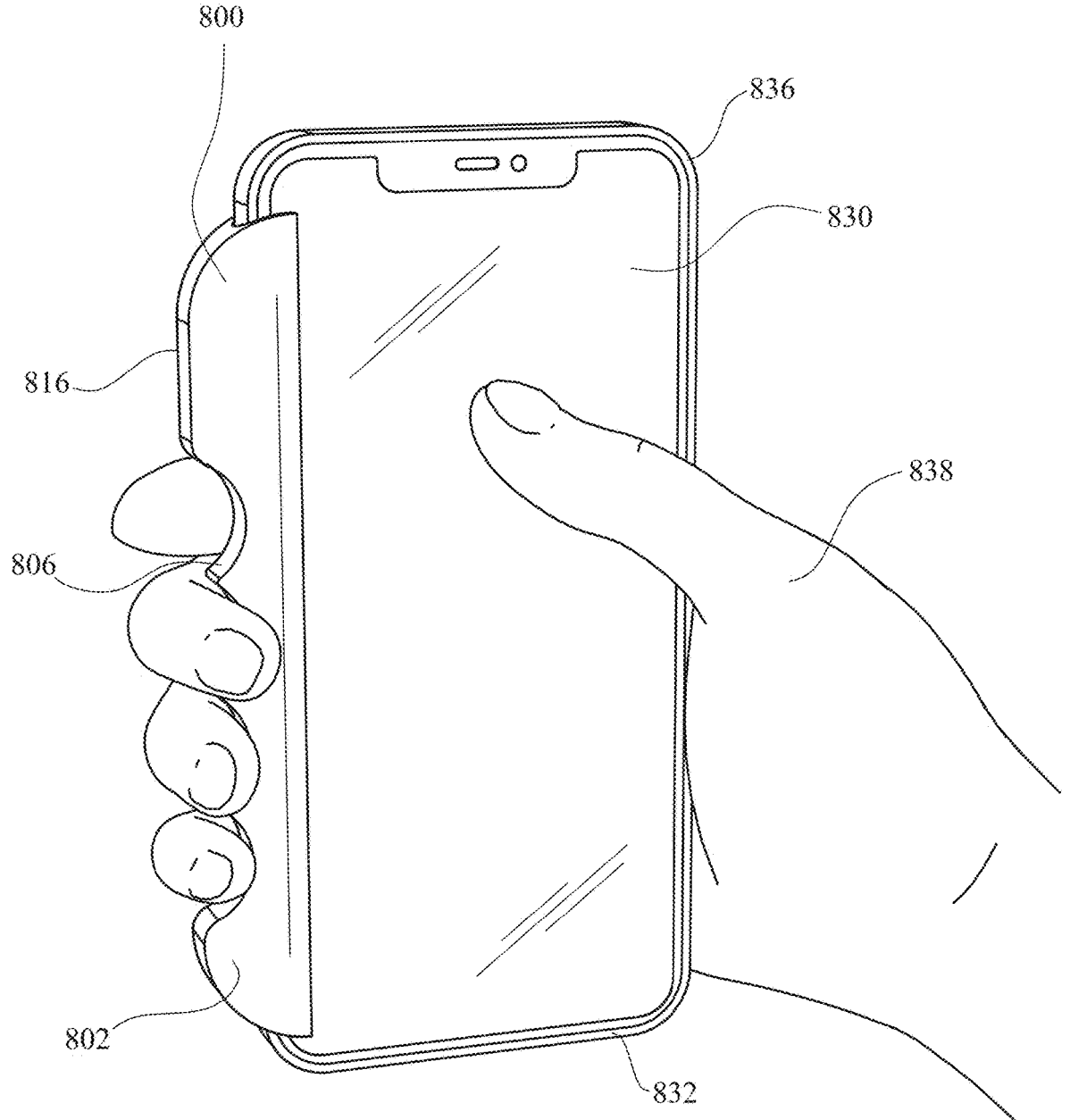
Figure 9A:
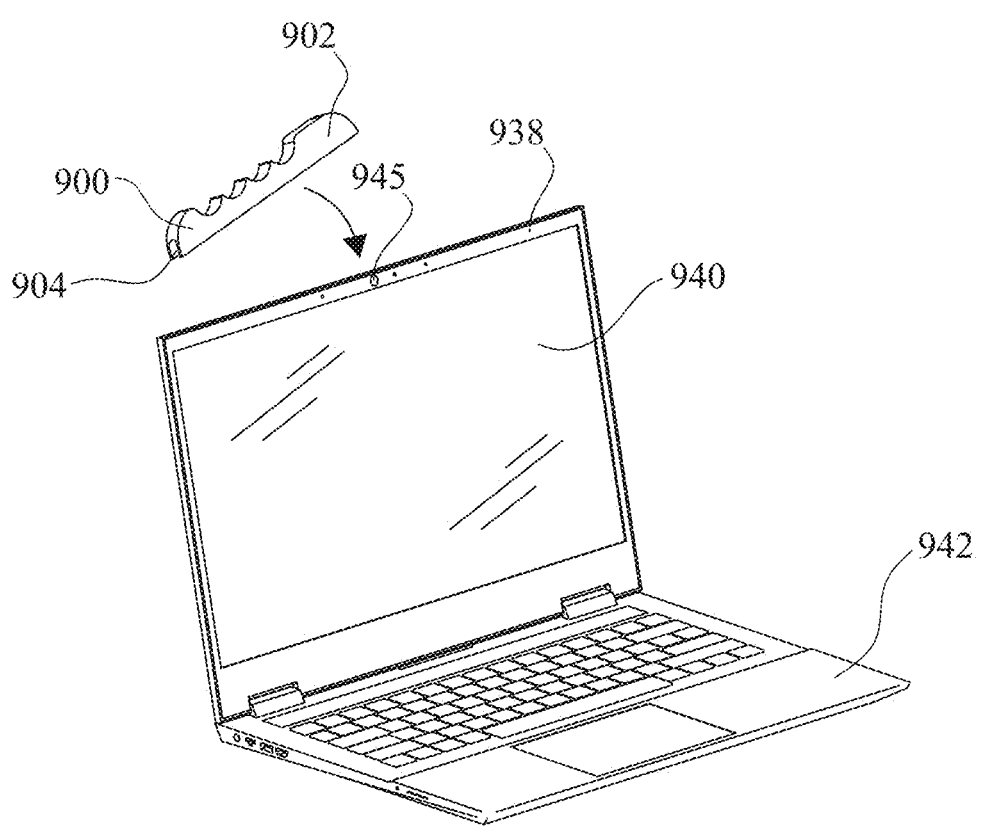
Figure 9B:
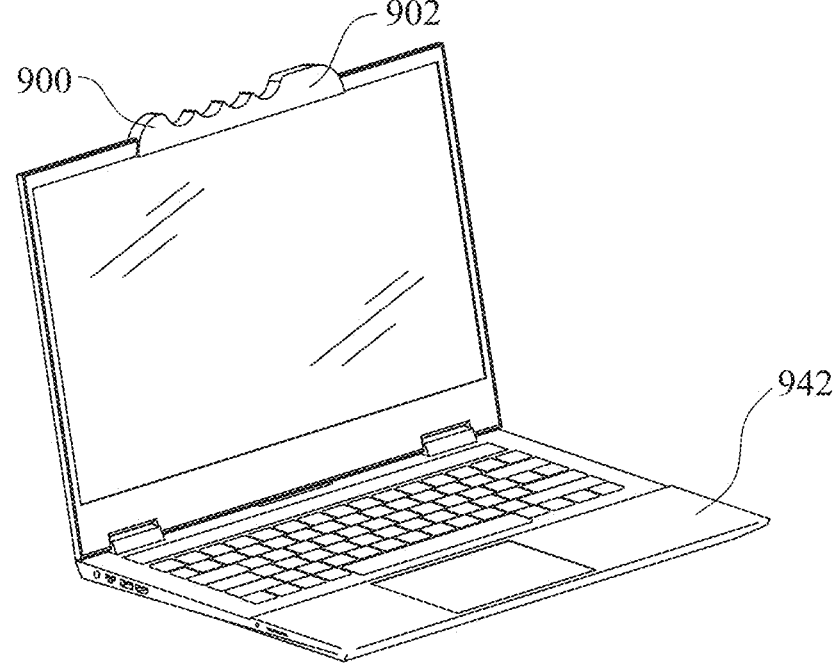
Figure 10:
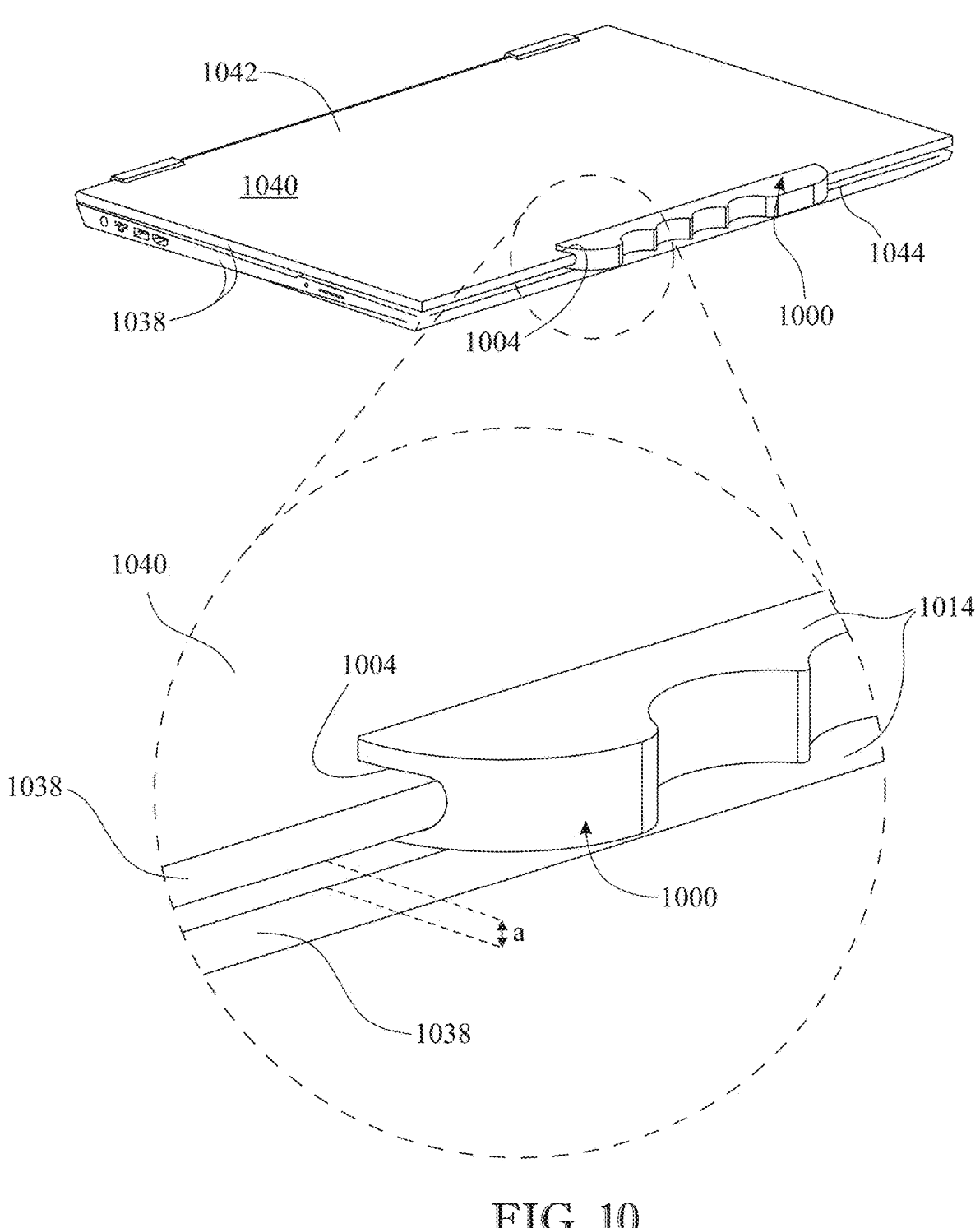
Figure 11:
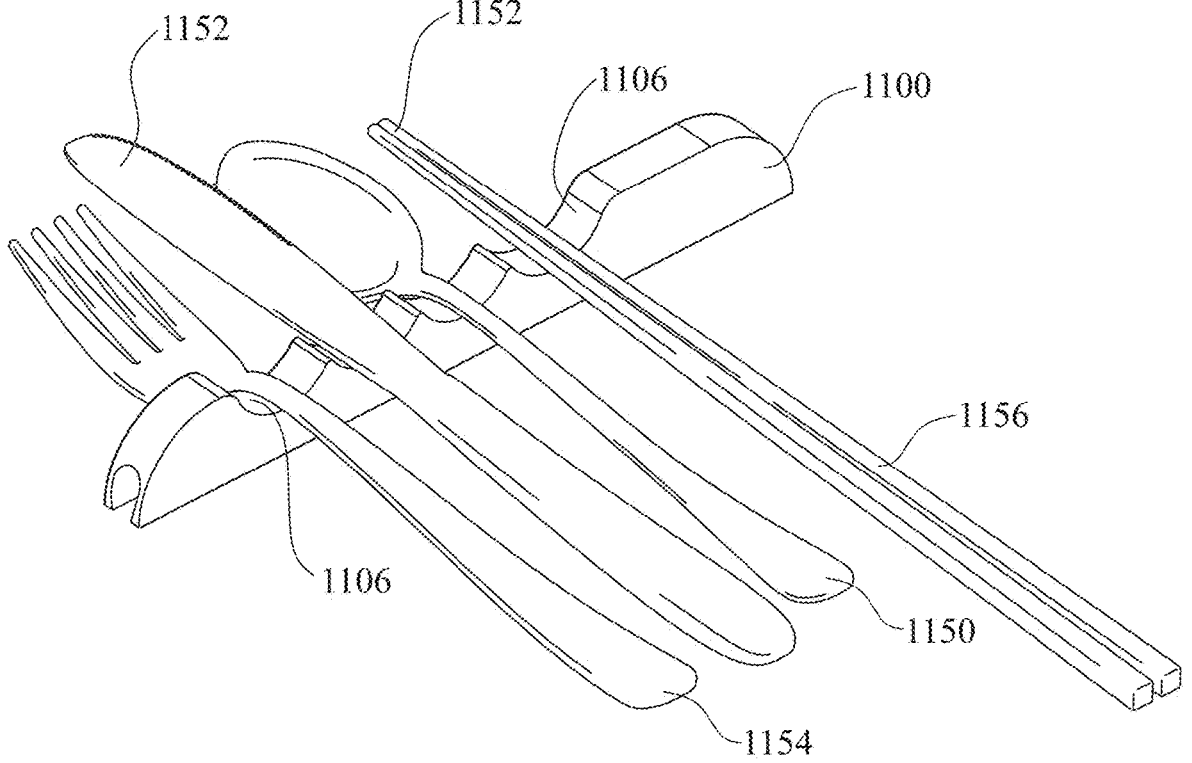
Figure 12:
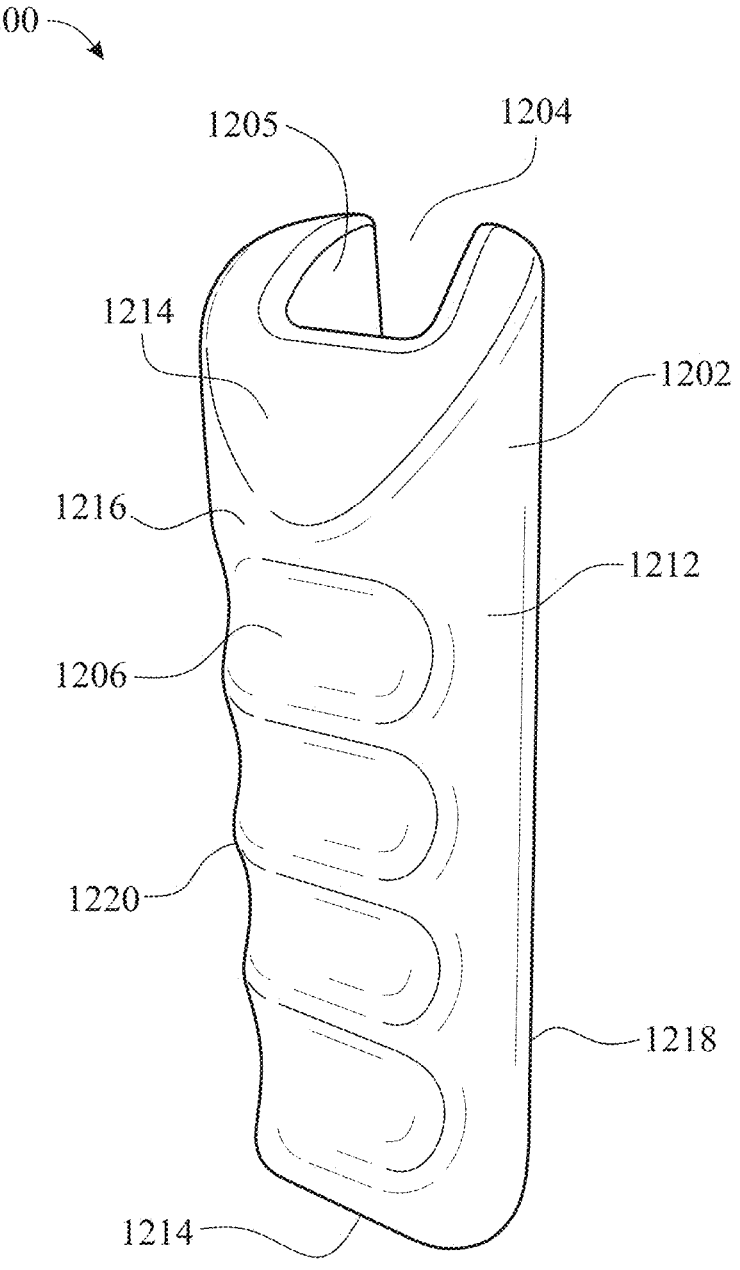
Figure 13:
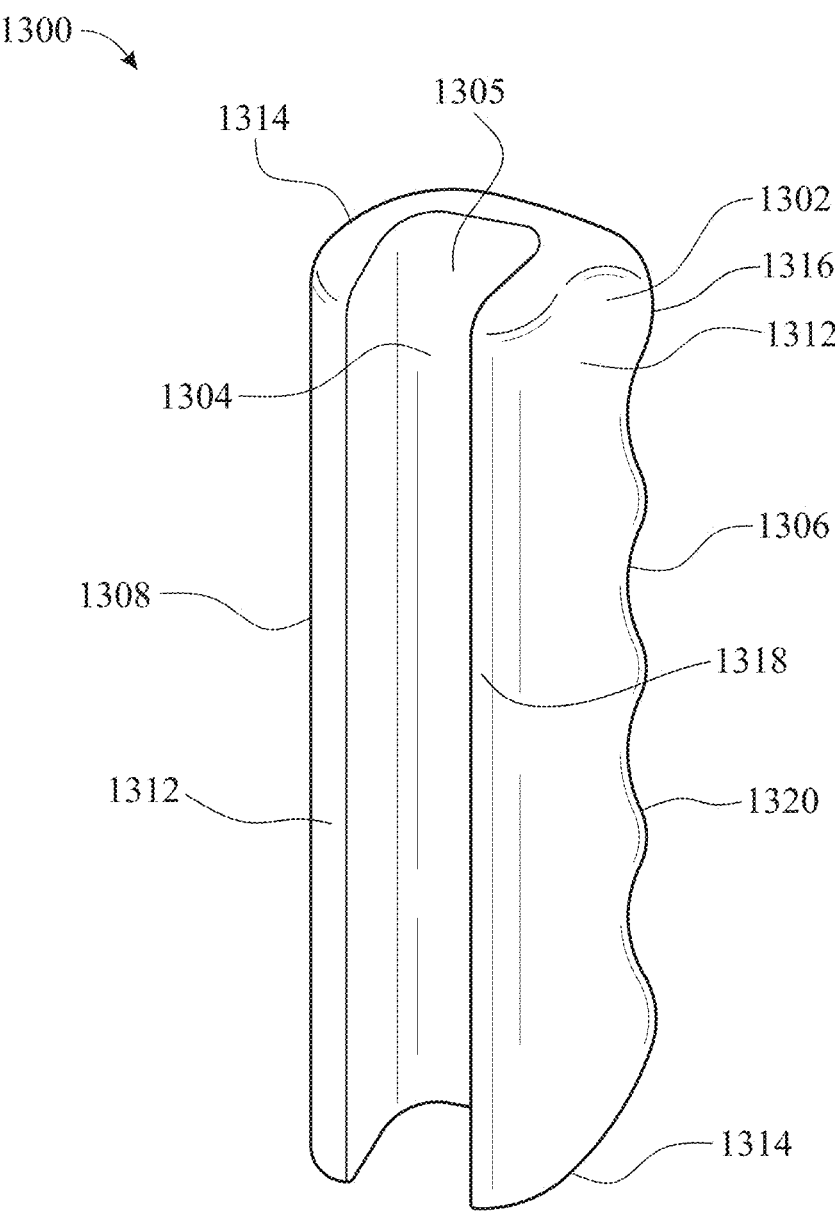
Figure 14:
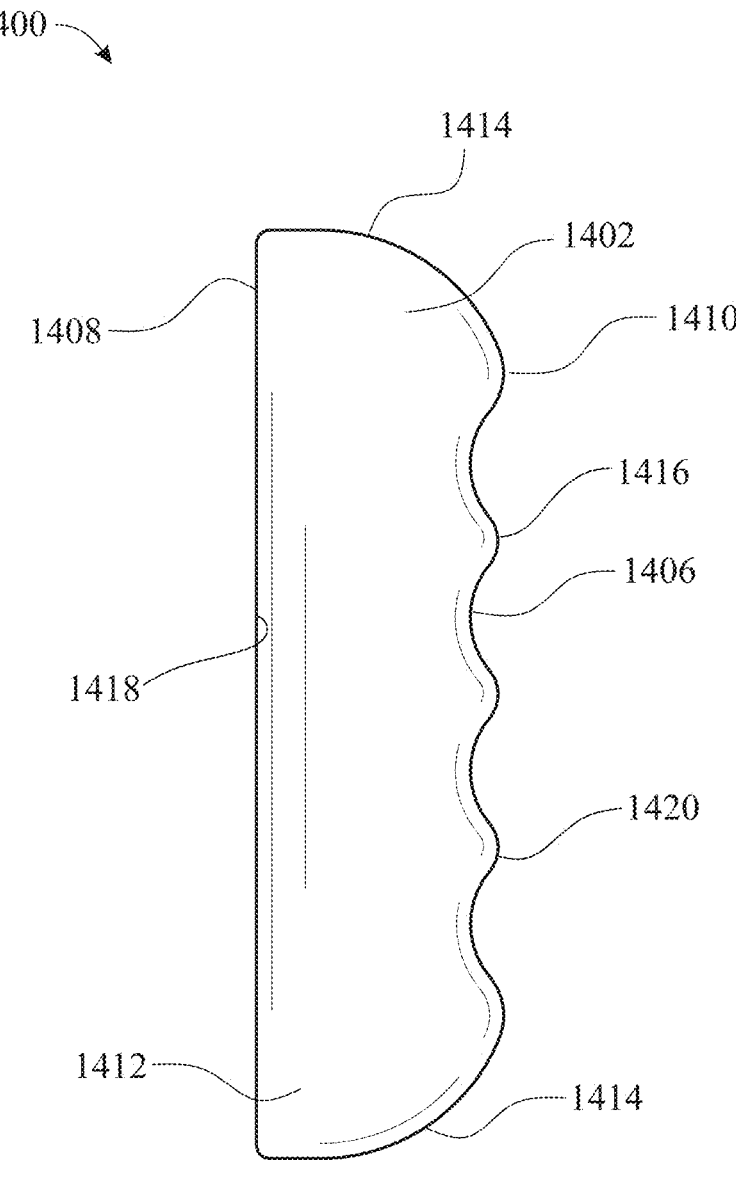
Figure 15:
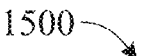
Figure 15:
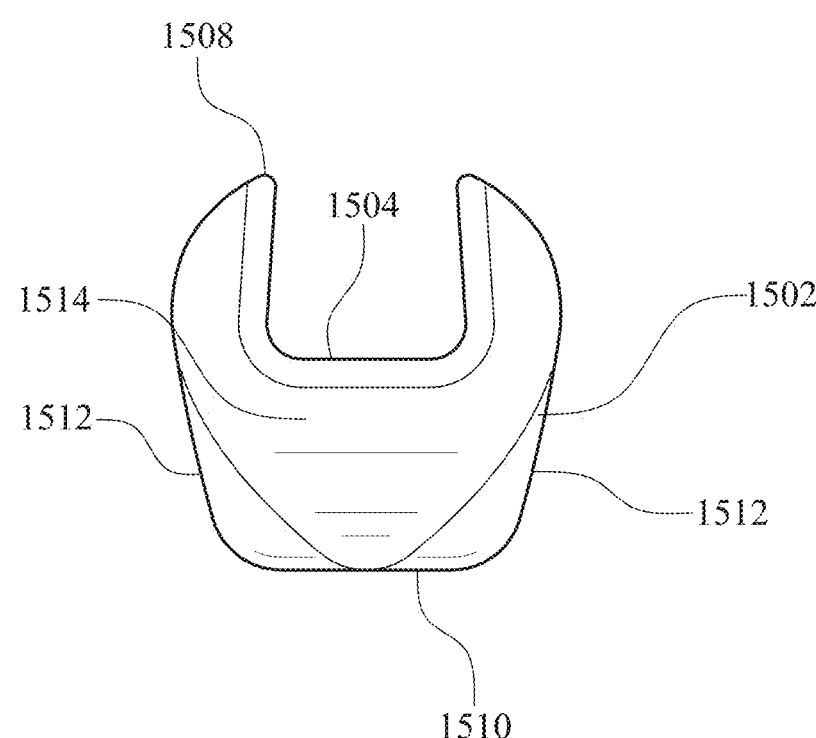
Figure 16:
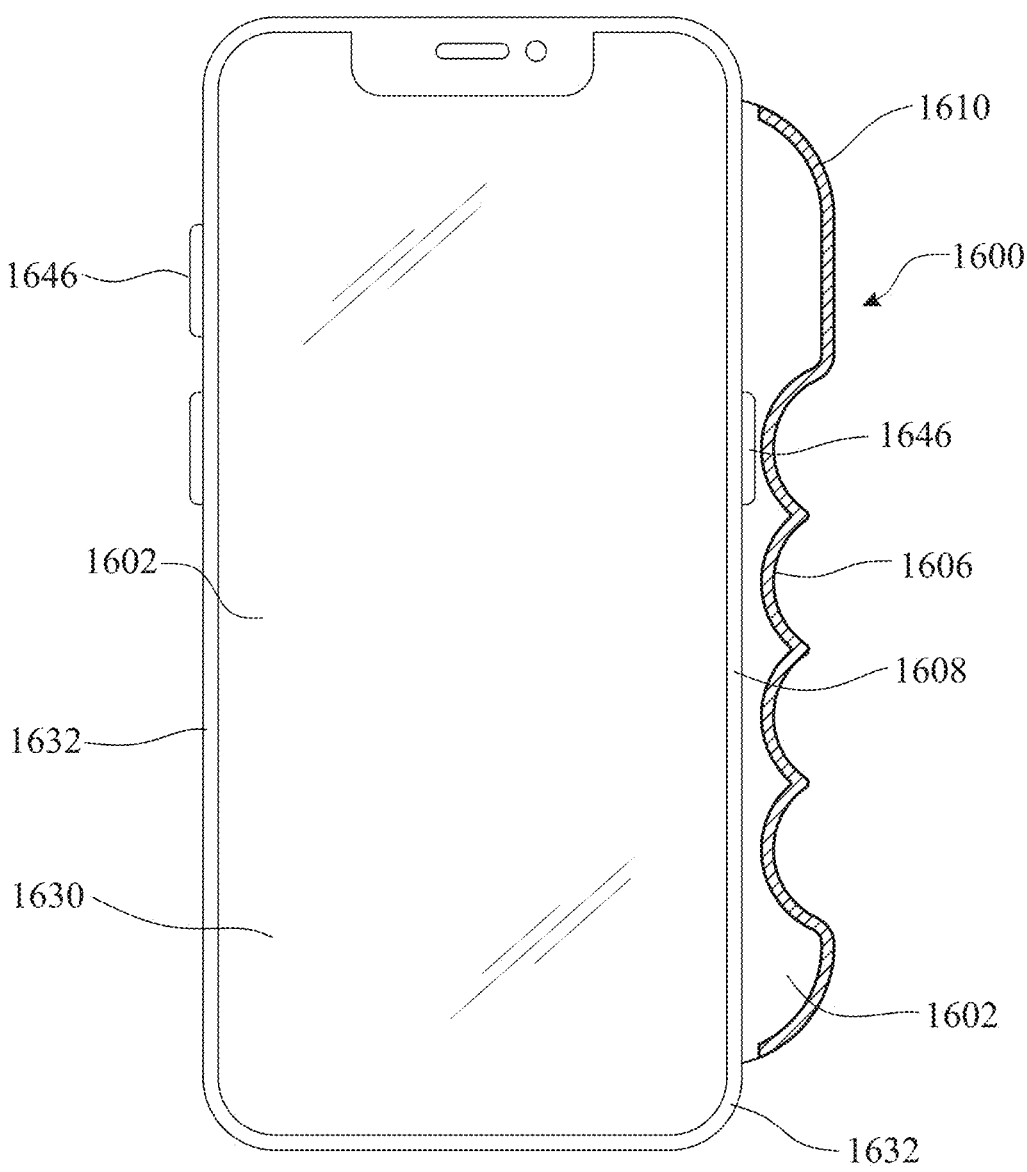
Figure 17:
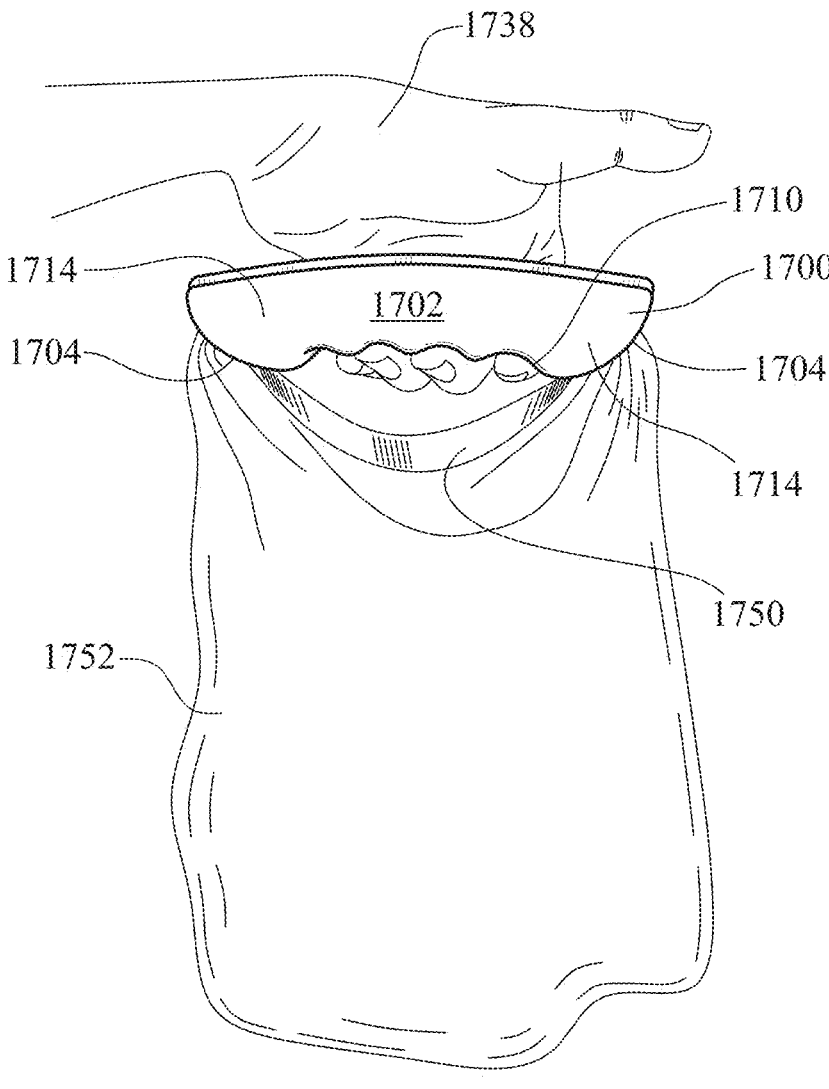
Figure 18:
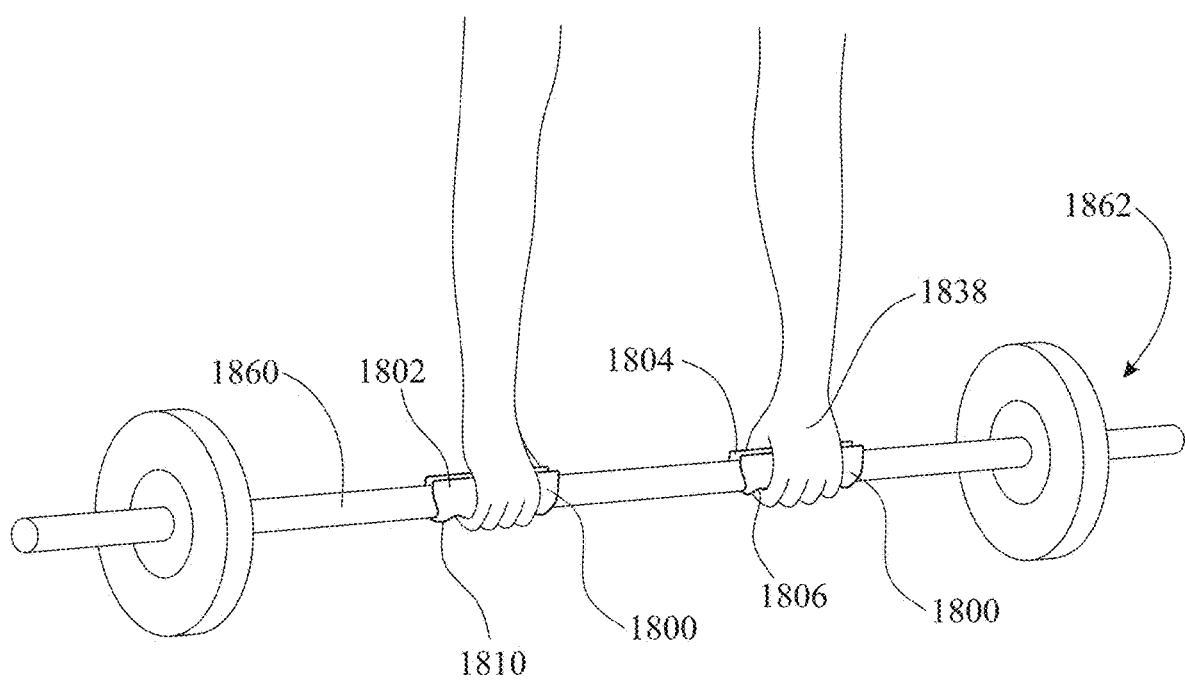
Figure 19:
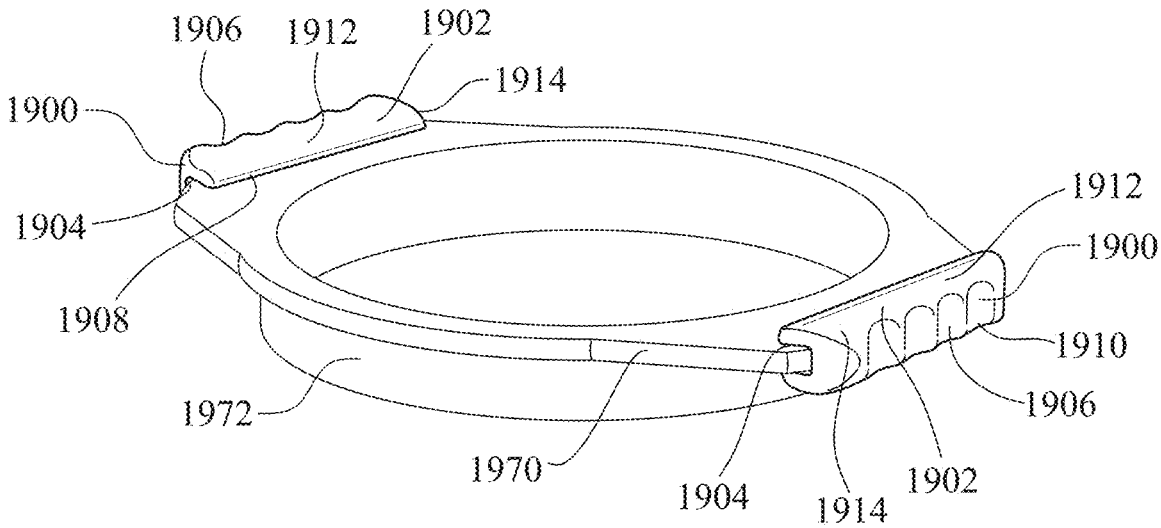
Figure 20:
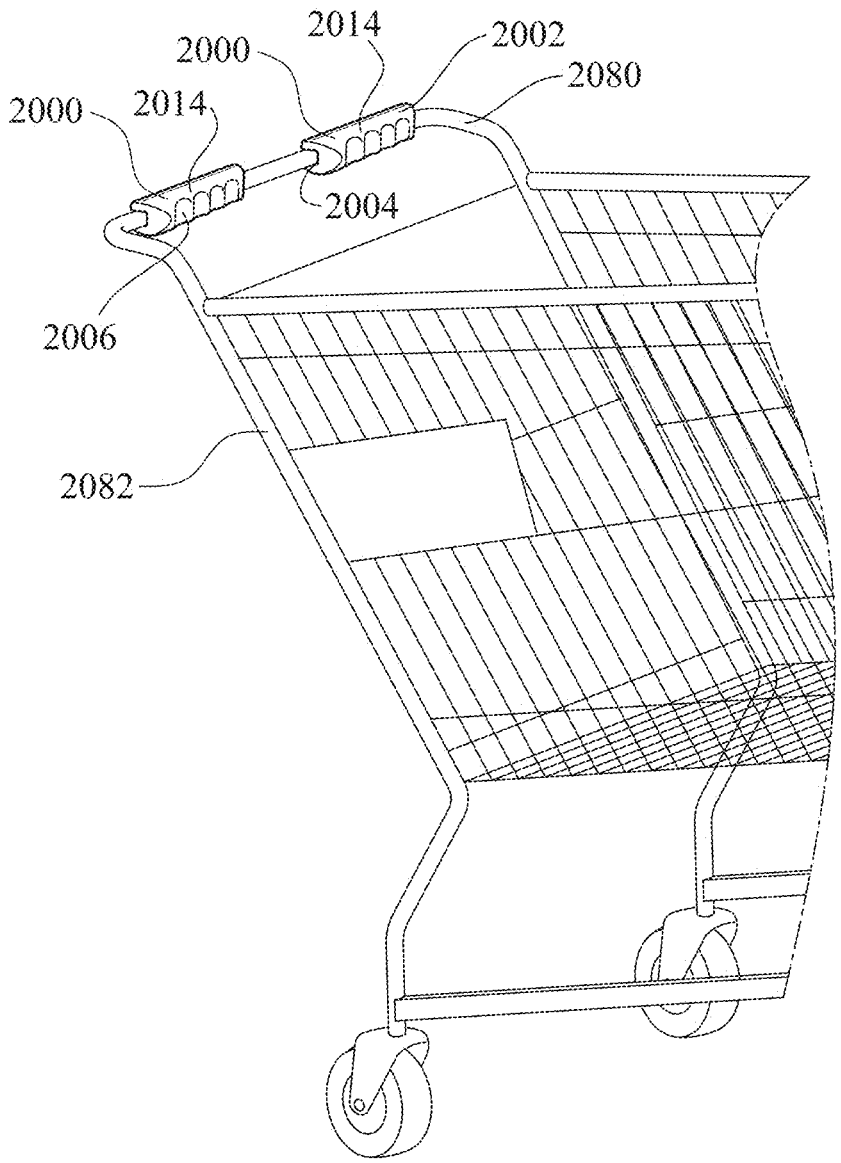
Figure 21:
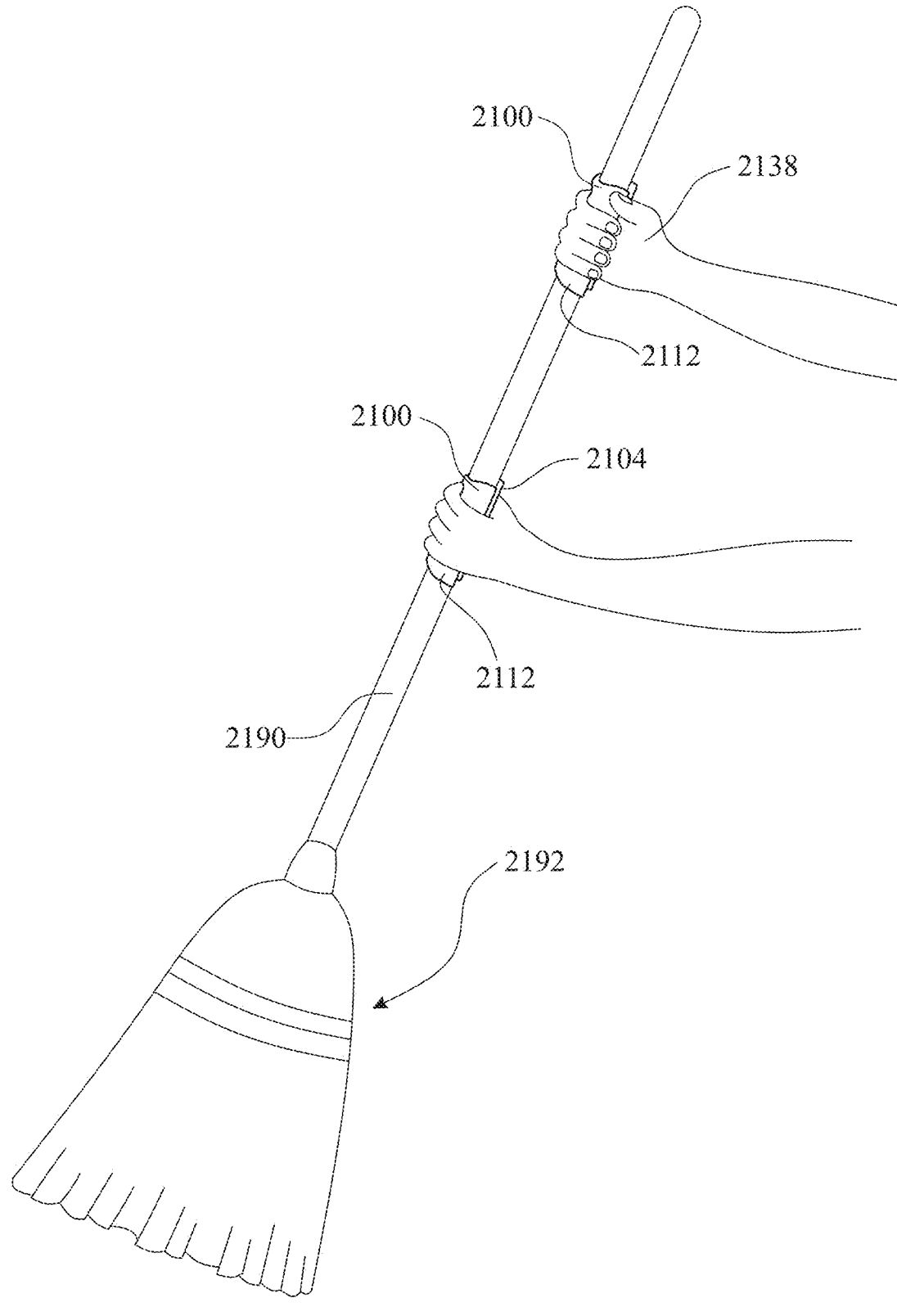

FIG. 1 presents a front-perspective view of a gripping attachment apparatus according to an aspect of the present invention;

FIG. 2 presents a rear perspective view of the gripping attachment apparatus shown in FIG. 1;

FIG. 3 presents a side elevational view of a gripping attachment apparatus shown in FIG. 1;

FIG. 4 presents a plan view of a gripping attachment apparatus shown in FIG. 1;

FIG. 5 presents a perspective view showing that a gripping attachment apparatus according to an aspect of the present invention is engaged with a handheld electronic device;

FIG. 6 presents a perspective view showing that a gripping attachment apparatus according to an aspect of the present invention is engaged with an external device case surrounding a handheld electronic device;

FIG. 7 presents a perspective view showing that a gripping attachment apparatus according to an aspect of the present invention is gripped by a left hand of a user;

FIG. 8 presents a perspective view showing that a gripping attachment apparatus according to an aspect of the present invention is gripped by a right hand of a user;

FIGS. 9A and 9B present perspective views showing that a gripping attachment apparatus according to an aspect of the present invention is released from and attached to a display screen of a laptop computer in the open position, respectively;

FIG. 10 presents a perspective showing that a gripping attachment apparatus according to an aspect of the present invention is attached to a display screen of a laptop computer in the closed position;

FIG. 11 presents a perspective view showing that a gripping attachment apparatus according to an aspect of the present invention is engaged with utensils;

FIG. 12 presents a front perspective view showing a gripping attachment apparatus according to a second aspect of the present invention;

FIG. 13 presents a rear perspective view showing a gripping attachment apparatus according to a second aspect of the present invention;

FIG. 14 presents a side elevational view of a gripping attachment apparatus shown in FIG. 12;

FIG. 15 presents a plan view of a gripping attachment apparatus shown in FIG. 12;

FIG. 16 presents a front elevation view showing a gripping attachment apparatus engaged with a handheld electronic device as shown in FIG. 5 with a portion of the gripping attachment apparatus cut away;

FIG. 17 presents a perspective view showing a gripping attachment apparatus according to an aspect of the present invention engaged with a bag;

FIG. 18 presents a perspective view showing a gripping attachment apparatus according to an aspect of the present invention engaged with the rod portion of a weight set;

FIG. 19 presents a perspective view showing a gripping attachment apparatus according to an aspect of the present invention engaged with a pan;

FIG. 20 presents a perspective view showing a gripping attachment apparatus; according to an aspect of the present invention engaged with the handle of a shopping cart; and FIG. 21 presents a perspective view showing a gripping attachment apparatus according to an aspect of the present invention engaged with the handle of a broom.

Like reference numerals refer to like parts throughout the several views of the drawings.

DETAILED DESCRIPTION

The following detailed description is merely exemplary in nature and is not intended to limit the described aspects or the application and uses of the described aspects. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the aspects of the disclosure and are not intended to limit the scope of the disclosure, which is defined by the claims. For purposes of description herein, the terms "upper," "lower," "left," "rear", "right", "front", "vertical", "horizontal", and derivatives thereof shall relate to the invention as oriented. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary aspects of the inventive concepts defined in the appended claims. Hence, specific dimensions and other physical characteristics relating to the aspects disclosed herein are not to be considered as limiting, unless the claims expressly state otherwise.

As a preliminary matter, it will readily be understood by one having ordinary skill in the relevant art that the present disclosure has broad utility and application. As should be understood, any aspect may incorporate only one or a plurality of the above-disclosed aspects of the disclosure and may further incorporate only one or a plurality of the above-disclosed features. Furthermore, any aspect discussed and identified as being "preferred" is considered to be part of the best mode contemplated for carrying out the aspects of the present disclosure Other aspects also may be discussed for additional illustrative purposes in providing a full and enabling disclosure. Moreover, many aspects, such as adaptations, variations, modifications, and equivalent arrangements, will be implicitly disclosed by the aspects described herein and fall within the scope of the present disclosure.

Accordingly, while aspects are described herein in detail in relation to one or more aspects, it is to be understood that this disclosure is illustrative and exemplary of the present disclosure and is made merely for the purposes of providing a full and enabling disclosure. The detailed disclosure herein of one or more aspects is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but do not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many aspects of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after a review of the following figures and description. It should be understood at the outset that, although exemplary aspects are illustrated in the figures and described below, the principles of the present disclosure may be implemented using any number of techniques, whether currently known or not. The present disclosure should in no way be limited to the exemplary implementations and techniques illustrated in the drawings described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightward", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Shown throughout the figures, the present invention is directed toward a gripping attachment apparatus for gripping an item having an attachment surface. It is an advantage of the present that the gripping attachment apparatus is useful for a number of different items.

Referring initially to FIG. 1 there is shown a front-perspective view of a gripping attachment apparatus 100 according to an aspect of the present invention.

Now referring to FIG. 5, according to an aspect of the present invention, the gripping attachment apparatus 100 may be configured to slidably receive a handheld electronic device 530, such as by receiving a long side 532 of the handheld electronic device 530 or, now referring to FIG. 6, according to an aspect of the present invention, the gripping attachment apparatus 600 may be configured to slidably receive the external device case 634 surrounding the handheld electronic device 630, such by receiving a long side of the external device case 636.

Returning to the aspect shown in FIG. 1, The gripping attachment apparatus 100 may comprise an elongated main body 102. The elongated main body may have dimensions suitable to provide an item to be gripped by a user's hand 1738 (FIG. 7). For example, representative lengths may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the elongated main body may have a length from about 3.5 inches up to about 4.5 inches. Representative heights may be, without limitation, from about 0.5 inches up to about 3 inches, in some aspects, from about 1 inch up to about 2 inches, and in some aspects, from about 1.5 inches up to about 1.75 inches. In the aspect shown in FIG. 1, the elongated main body may have a height of from about 1.0 inch up to about 2 inches Representative widths may be, without limitation, from about 0.375 inch up to about 1 inch, in some aspects in some aspects from about 0.25 inch up to about 0.75 inch and in some aspects from about 0.375 inch up to about 0.5 inch. In the aspect shown in FIG. 1, the elongated main body may have a height of 0.25 inch up to about 0.75 inch According to the aspect shown in FIG. 1, the elongated main body 102 may be made of any suitable material. For example, the material may be pliable to enhance its gripability. Representative materials include, without limitation, plastic materials such as polyethylene, polypropylene, polyethylene terephthalate, PVC, rubber, EPDM rubber, thermoplastic polyurethane, ethylene-vinyl acetate, natural rubber, and combinations thereof. In some aspects, the material may enable glow-in-the-dark function of the gripping attachment apparatus 100. Representative materials include, without limitation, a phosphorescent silicone material that activates in darkness.

According to the aspect shown in FIG. 1, the gripping attachment apparatus 100 may comprise an attachment socket 104 dimensioned to receive an item, such as a handheld electronic device with or without an external device case surrounding the handheld electronic device.

According to the aspect shown in FIG. 1, the attachment socket 104 may be formed on the elongated main body 102.

According to the aspect shown in FIG. 1, the attachment socket 104 may have a longitudinal groove 105. Representative lengths of the longitudinal groove may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the longitudinal groove may have a length from about 3.5 inches up to about 4.5 inches.

According to the aspect shown in FIG. 1, the longitudinal groove 10 may have any suitable shape configured to receive an item, such as handheld electronic devices. Representative cross-sections include, without limitation, a tear shape, a semi-circle shape, a tunnel shape, or three sides of a square or rectangle, such that the attachment socket 104 may be adapted to handheld electronic devices with various sizes and thicknesses or external device cases with various sizes and thickness. In the aspect shown in FIG. 1, the longitudinal groove 105 has a tear shape cross section.

Representative heights of the longitudinal groove's 105 cross-section may be, without limitation, from about 0.25 inches up to about 1.5 inches, in some aspects from about 0.5 inches up to about 1 inch, and in some aspects from about 0.75 inches up to about 1.375 inches. In the aspect shown in FIG. 1, the longitudinal groove may have a height of from about 0.5 inch up to about 1 inch. Representative widths may be, without limitation, from about 0.062 inch up to about 0.375 inch and in some aspects from about 0.125 inch up to about 0.25 inch., In the aspect shown in FIG. 1 the longitudinal grooves may have a width of at least about 0.165 inch.

In some aspects, the longitudinal groove 105 may have a semi-circular cross-section forming an arc having a diameter of from about 0.5 inch up to about 3 inches, in some aspects from about 1 inch up to about 2 inches, and in some aspects from about 1.5 inches up to about 2.75 inches. In the aspect shown in FIG. 1, the longitudinal groove may have a tear shape cross section forming an arc with a width of from about 0.125 inch up to about 0.25 inch at the top end, from about 0.375 inch up to about 1.125 inches at the bottom end and an are length of from about 1.5 inches up to about 2.75 inches.

According to the aspect shown in FIG. 1, the plurality of gripping grooves 106 may be formed on the elongated main body 102.

According to the aspect shown in FIG. 1, the plurality of gripping grooves 106 may be configured to receive the fingers of a left hand or a right hand of a user, such that the gripping attachment apparatus 100 can be used with both hands in an ambidextrous way.

In accordance with the representative aspect shown in FIG. 1, there are four gripping grooves 106 for four fingers.

The gripping grooves 106 may be of any suitable size and shape. According to the aspect shown in FIG. 1, the plurality of gripping grooves 106 may be molded to have a width and be spaced apart a distance to provide shapes of fingers. For example, there are four gripping grooves 106 for four fingers.

According to the aspect shown in FIG. 1, the plurality of gripping grooves 106 may be configured to provide a gripping function for the gripping attachment apparatus 100 to give a user a comfort and better grip on the handheld electronic device 530 (FIG. 5) or the external device case 640 surrounding the handheld electronic device 630 (FIG. 6).

In some aspects, the gripping grooves 106 may have a semi-circular or tunnel-shaped cross-section. In the aspect shown in FIG. 1, gripping grooves may have a semi-circular cross-section forming an arc having a diameter of from about 0.5 inch up to about 3 inches, in some aspects from about 1 inch up to about 2 inches, and in some aspects from about 1.5 inches up to about 2.75 inches.

In some aspects, the sides of adjacent gripping grooves 106 form apices 120. The apices 120 may have any suitable height. Representative heights, which may be the same or different, include without limitation, from about 0.25 inch up to about 1.5 inches, in some aspects from about 0.5 inches up to about 1 inch, and in some aspects from about 0.75 inch up to about 1.375 inches. The apices may have any suitable shape, including without limitation, peaked or plateaued shapes. In the aspect shown in FIG. 1, each apex may have a plateau shape, and the width of the plateau may be from about 0.125 inch up to about 0.25 inch.

According to the aspect shown in FIG. 1, the attachment socket 104 and the plurality of gripping grooves 106 may be located opposite to each other about the elongated main body 102.

According to the aspect shown in FIG. 1, the elongated main body 102 may comprise a contact side 108 having a contact surface 118.

According to the aspect shown in FIG. 1, the contact side 108 may be flat.

According to the aspect shown in FIG. 1, the elongated main body 102 may comprise a gripping side 110 having a gripping surface 116.

According to the aspect shown in FIG. 1, the elongated main body 102 may comprise two lateral sides 112 (one shown).

According to the aspect shown in FIG. 1, the two lateral sides 112 may be flat.

According to the aspect shown in FIG. 1, the elongated main body 102 may comprise two ends 114.

The two ends 114 each may have any suitable shape and may be the same or different. Representative examples include, without limitation flat ends or rounded ends, or chamfered ends. In the aspect shown in FIG. 1, both ends may be rounded to provide an aesthetic function of the gripping attachment apparatus 100.

According to the aspect shown in FIG. 1, the contact side 108 and the gripping side 110 may be located opposite to each other.

According to the aspect shown in FIG. 1, the two lateral sides 112 (one shown) may be located opposite to each other.

According to the aspect shown in FIG. 1, the two ends 114 may be located opposite each other.

According to the aspect shown in FIG. 1, the contact side 108 and the gripping side 110 may be located between the two ends 114.

According to the aspect shown in FIG. 1, the two lateral sides 112 may be located between the two ends 114.

According to the aspect shown in FIG. 1, the contact side 108 and the gripping side 110 may be located between the two lateral sides 113.

According to the aspect shown in FIG. 1, the attachment socket 104 may be formed on the contact side 108.

According to the aspect shown in FIG. 1, the attachment socket 104 may traverse into the contact side 108.

According to the aspect shown in FIG. 1, the attachment socket 104 may extend between the two ends 114.

According to the aspect shown in FIG. 1, the attachment socket 104 may traverse through the two ends 114.

According to the aspect shown in FIG. 1, the plurality of gripping grooves 106 may be formed on the gripping side 110.

According to the aspect shown in FIG. 1, the plurality of gripping grooves 106 may traverse into the gripping side 110, between apices 120.

According to the aspect shown in FIG. 1, the plurality of gripping grooves 106 may be distributed between the two ends 114.

According to the aspect shown in FIG. 1, the plurality of gripping grooves 106 may be separate from each other along the gripping side 110.

Referring to FIG. 2, there is shown a rear perspective view of the gripping attachment apparatus as described in connection with FIG. 1. The gripping attachment apparatus 200 may comprise an elongated main body 202.

According to the aspect shown in FIG. 2, the gripping attachment apparatus 200 may comprise an attachment socket 204.

According to the aspect shown in FIG. 2, the longitudinal grove 205 may have a tear shape cross section.

According to the aspect shown in FIG. 2, the gripping attachment apparatus 200 may comprise a plurality of gripping grooves 206.

According to the aspect shown in FIG. 2, the sides of adjacent gripping grooves 206 form apices 220.

According to the aspect shown in FIG. 2, the attachment socket 204 and the plurality of gripping grooves 206 may be located opposite to each other about the elongated main body 202.

According to the aspect shown in FIG. 2, the elongated main body 202 may comprise a contact side 208 having a contact surface 218.

According to the aspect shown in FIG. 2, the elongated main body 202 may comprise a gripping side 210 having a gripping surface 216.

According to the aspect shown in FIG. 2, the elongated main body 202 may comprise two lateral sides 212.

According to the aspect shown in FIG. 2, the elongated main body 202 may comprise two ends 214.

According to the aspect shown in FIG. 2, the sides of adjacent gripping grooves 206 form apices 220.

According to the aspect shown in FIG. 2, the plurality of gripping grooves 206 may traverse into the gripping side 210, between apices 220.

Referring to FIG. 3, there is shown a side elevation view of the gripping attachment apparatus as described in connection with FIG. 1. The gripping attachment apparatus 300 may comprise an elongated main body 302.

According to the aspect shown in FIG. 3, the gripping attachment apparatus 300 may comprise an attachment socket 304.

According to the aspect shown in FIG. 3, a cross-section of attachment socket 304 may have a longitudinal groove

305 having any suitable shape. In the aspect shown in FIG. 3, the longitudinal grove 305 has a tear shape cross section.

According to the aspect shown in FIG. 3, the gripping attachment apparatus 300 may comprise a plurality of gripping grooves 306.

According to the aspect shown in FIG. 3, the elongated main body 302 may comprise a contact side 308 having a contact surface 318.

According to the aspect shown in FIG. 3, the elongated main body 302 may comprise a gripping side 310 having a gripping surface 316.

According to the aspect shown in FIG. 3, the elongated main body 302 may comprise two lateral sides 312.

According to the aspect shown in FIG. 3, the elongated main body 302 may comprise two ends 314.

According to the aspect shown in FIG. 3, the sides of adjacent gripping grooves 306 form apices 320.

Referring to FIG. 4, there is shown a plan view of the gripping attachment apparatus as described in connection with FIG. 1. The gripping attachment apparatus 400 may comprise an elongated main body 402.

According to the aspect shown in FIG. 4, the gripping attachment apparatus 400 may comprise an attachment socket 404.

According to the aspect shown in FIG. 4, a cross-section of the longitudinal grove 405 may have a tear shape cross section.

According to the aspect shown in FIG. 4, the elongated main body 402 may comprise a contact side 408 having a contact surface 418.

According to the aspect shown in FIG. 4, the elongated main body 402 may comprise a gripping side 410 having a gripping surface 416.

According to the aspect shown in FIG. 4, the elongated main body 402 may comprise two lateral sides 412.

According to the aspect shown in FIG. 4, the elongated main body 402 may comprise two ends 414.

According to the aspect shown in FIG. 4, the sides of adjacent gripping grooves 406 form apices 420.

Referring to FIG. 5, there is shown a perspective view showing a gripping attachment apparatus 500 as described in connection with FIGS. 1-4 engaged with a handheld electronic device 530.

According to the aspect shown in FIG. 5, the gripping attachment apparatus 500 may comprise an elongated main body 502.

According to the aspect shown in FIG. 5, the elongated main body 502 may comprise a contact side 508 and an opposing gripping side 510.

According to the aspect shown in FIG. 5, the gripping attachment apparatus 500 may comprise an attachment socket 504 formed on the elongated main body 502.

According to the aspect shown in FIG. 5, the gripping attachment apparatus 500 may comprise a plurality of gripping grooves 506 formed on the gripping side.

It is an advantage of the gripping attachment apparatus in accordance with the present invention that it may be configured to receive a wide range of handheld electronic devices with or without an external device case surrounding the handheld electronic device. According to the aspect shown in FIG. 5, the handheld electronic device 530 may have a pair of opposing long sides 532, and the attachment socket 504 may be configured to releasably receive one of the long sides 532. Illustrative lengths of the long side include, without limitation, lengths of about 4 inches up to about 6 inches, in some aspects from about 4.5 inches up to about 5.5 inches, and in some aspects at least about 4 inches.

In the present aspect shown in FIG. 1, the handheld electronic device may have a length of from about 4.5 inches up to about 5.5 inches. According to the aspect shown in FIG. 5, the handheld electronic device may be configured to slidably releasably receive one of the long sides 532.

Referring to FIG. 6, there is shown a perspective view showing a gripping attachment apparatus 600 as described in connection with FIGS. 1-4 engaged with an external device case 634 of handheld electronic device 630.

The gripping attachment apparatus 600 may comprise an elongated main body 602.

According to the aspect shown in FIG. 6, the elongated main body 602 may comprise a contact side 608 and an opposing gripping side 610.

According to the aspect shown in FIG. 6, the gripping attachment apparatus 600 may comprise an attachment socket 604 formed on the elongated main body 602.

According to the aspect shown in FIG. 6, the gripping attachment apparatus 600 may comprise a plurality of gripping grooves 606 formed on the gripping side 610.

According to the aspect shown in FIG. 6, the handheld electronic device external case 634, may have a pair of opposing long sides 632 and the attachment socket 604 may be configured to releasably receive one of the long sides 632. Illustrative lengths of the long sides include, without limitation, lengths of from about 3.25 inches up to about 6.25 inches, in some aspects from about 4.25 inches up to about 5.25 inches, and in some aspects at least about 4.25 inches. In the aspect shown in FIG. 6, the handheld long sides may have a length of from about 4.25 inches up to about 5.25 inches. According to the aspect shown in FIG. 6, the gripping attachment apparatus 600 may be configured to slidably releasably receive one of the long sides 632.

Referring to FIG. 7, there is shown a perspective view showing a gripping attachment apparatus 700 as described in connection with FIGS. 1-4 using an attachment socket 704 dimensioned to receive the long side 732 of an external case 734 of a handheld electronic device 730 using an attachment socket 704.

According to the aspect shown in FIG. 7, the gripping attachment apparatus may be gripped by a left hand of a user 738 using four grooves 706 formed on the gripping side 710 in the elongated body 702.

Referring to FIG. 8 there is shown a perspective view showing a gripping attachment apparatus 800 as described in connection with FIGS. 1-4 using an attachment socket 804 dimensioned to receive the long side 836 of an external case 832 of a handheld electronic device 830.

According to the aspect shown in FIG. 8, the gripping attachment apparatus may be gripped by a left hand of a user 838 using four gripping grooves 806 formed on the gripping side 810 in the elongated body 802.

FIGS. 9A and 9B are perspective views showing a gripping attachment apparatus 900 as described in connection with FIGS. 1-4 may be released from (FIG. 9A) and attached to (FIG. 9B) an edge 938 of a display screen 940 of a laptop computer 942.

According to the aspect shown in FIGS. 9A and 9B, the gripping attachment apparatus 900 may be engaged using an attachment socket 904 formed between two lateral sides 914 (one shown) of the gripping attachment apparatus 900 and dimensioned to receive the edge 938 of the display screen 940 of the laptop computer 942.

It is an advantage of the gripping attachment apparatus in accordance with the present invention that it may be configured to receive a wide range of laptop computers 942 having display screens 940 with edges 938 having different widths. Representative widths include, without limitation, widths of about 0.25 inch up to about 0.62 inch, in some aspects about from about 0.375 inch up to about 0.5 inch, and in some aspects at least about 0.375 inch. In the aspect shown in FIGS. 9A and 9B, the elongated main edge may have a width of from about 0.375 inch up to about 0.5 inch.

According to the aspect shown in FIGS. 9A and 9B, the edge 938 of the display screen 940 of the laptop computer 942 includes a camera 944 and the gripping attachment apparatus 900 may be positioned over the camera to prevent operation of the camera.

Referring to FIG. 10, there is shown a perspective view showing a gripping attachment apparatus 1000 as described in connection with FIGS. 1-4 may be received by an edge 1038 of a display screen 1040 of a laptop computer 1042.

According to the aspect shown in FIG. 10, the gripping attachment apparatus 1000 may be engaged using an attachment socket 1004 formed between two lateral sides 1014 and dimensioned to receive the edge 1038 of the display screen 1040 of the laptop computer 1042.

The sides of the groove 1006 may be formed with any suitable width a. According to the aspect shown in FIG. 10, the width may be chosen so that the laptop computer 1042 can be closed when the gripping attachment apparatus 1000 is attached to the edge 1038 of the display screen 1040. Representative widths include, without limitation, from about 0.375 inch up to about 1 inch, in some aspects from about 0.25 inch up to about 075 inch, and in some aspects from about 0.375 inch up to about 0.5 inch In the aspect shown in FIG. 10, the elongated main body may have a height of 0.25 inch up to about 0.75 inch Referring to FIG. 11 there is shown a perspective view showing a gripping attachment apparatus 1100 as described in connection with FIGS. 1-4 may use grooves 1106 dimensioned to receive items 1050 to separate the items and prevent one of the ends of the items 1152 from touching the surface on which the gripping attachment apparatus rests (not shown).

According to the aspect shown in FIG. 11, the gripping attachment apparatus 1100 may receive a wide range of items 1150. Representative items, including without limitation, silverware 1154, chopsticks 1156, and tools (not shown).

Referring to FIG. 12, there is shown a front perspective view of a gripping attachment apparatus 1200 according to an aspect of the present invention as described in connection with FIGS. 1-4. The gripping attachment apparatus 1200 may comprise an elongated main body 1202.

According to the aspect shown in FIG. 12, the gripping attachment apparatus 100 may comprise an attachment socket 1204 dimensioned to receive the long edge of a handheld electronic device with or without an external device case surrounding the handheld electronic device.

In the aspect shown in FIG. 12, the longitudinal groove 1205 has a cross-section formed by three sides of a square. The sides may be of any suitable length. Representative lengths include, without limitation, from about 0.25 inches up to about 1.5 inches, in some aspects from about 0.5 inches up to about 1 inch, and in some aspects from about 0.75 inches up to about 1.375 inches. In the aspect shown in FIG. 1, the side may have a length of from about 0.5 inch up to about 1 inch.

According to the aspect shown in FIG. 12, the gripping attachment apparatus 1200 may comprise a plurality of gripping grooves 1206.

According to the aspect shown in FIG. 12, the elongated main body 1202 may comprise a contact side 1208 having a contact surface 1218.

According to the aspect shown in FIG. 12, the elongated main body 1202 may comprise a gripping side 1210 having a gripping surface 1216.

According to the aspect shown in FIG. 12, the elongated main body 1202 may comprise two lateral sides 1212 (one shown).

According to the aspect shown in FIG. 12, the two lateral sides 1212 may be curved along their longitudinal axes.

According to the aspect shown in FIG. 12, the elongated main body 1202 may comprise two ends 1214.

In the aspect shown in FIG. 12, one end may be chamfered and the other end flat to provide an aesthetic function of the gripping attachment apparatus 1200.

Referring to FIG. 13, there is shown a front perspective view of the gripping attachment apparatus as described in connection with FIG. 12. The gripping attachment apparatus 1300 may comprise an elongated main body 1302.

According to the aspect shown in FIG. 13, the gripping attachment apparatus 1300 may comprise an attachment socket 1304.

According to the aspect shown in FIG. 13, the gripping attachment apparatus 1300 may comprise a plurality of gripping grooves 1306.

According to the aspect shown in FIG. 13, the elongated main body 1302 may comprise a contact side 1308 having a contact surface 1318.

According to the aspect shown in FIG. 13, the elongated main body 1302 may comprise a gripping side 1310 having a gripping surface 1316.

According to the aspect shown in FIG. 13, the elongated main body 1302 may comprise two lateral sides 1312.

According to the aspect shown in FIG. 13, the elongated main body 1302 may comprise two ends 1314.

According to the aspect shown in FIG. 13, one end 1314 may be chamfered and the other end 1314 may be rounded.

Referring to FIG. 14, there is shown a side elevation view of the gripping attachment apparatus as described in connection with FIG. 12. The gripping attachment apparatus 1400 may comprise an elongated main body 1402.

According to the aspect shown in FIG. 14, the gripping attachment apparatus 1400 may comprise an attachment socket 1404.

According to the aspect shown in FIG. 14, a cross-section of attachment socket 1404 may have a longitudinal groove 1405 having any suitable shape. In the aspect shown in FIG. 14, the longitudinal groove 1405 may be formed by three sides of a square.

According to the aspect shown in FIG. 14, the gripping attachment apparatus 1400 may comprise a plurality of gripping grooves 1406.

According to the aspect shown in FIG. 14, the elongated main body 1402 may comprise a contact side 1408 having a contact surface 1418.

According to the aspect shown in FIG. 14, the elongated main body 1402 may comprise a gripping side 1410 having a gripping surface 1416.

According to the aspect shown in FIG. 14, the elongated main body 1402 may comprise two lateral sides 1412.

According to the aspect shown in FIG. 14, the elongated main body 1402 may comprise two ends 1414.

According to the aspect shown in FIG. 14, one of the ends 1414 may be chamfered and the other end may be rounded.

Referring to FIG. 15 there is shown a plan view of the gripping attachment apparatus as described in connection with FIG. 12. The gripping attachment apparatus 1500 may comprise an elongated main body 1502.

According to the aspect shown in FIG. 15, the gripping attachment apparatus 1500 may comprise an attachment socket 1504.

According to the aspect shown in FIG. 15, the attachment socket 1504 may be formed on the elongated main body 1502.

According to the aspect shown in FIG. 15, the elongated main body 1502 may comprise a contact side 1508 having a contact surface 1518.

According to the aspect shown in FIG. 15, the elongated main body 1502 may comprise a gripping side 1510 having a gripping surface 1516.

According to the aspect shown in FIG. 15, the elongated main body 1502 may comprise two lateral sides 1512.

According to the aspect shown in FIG. 15, the elongated main body 1502 may comprise two ends 1514.

Referring to FIG. 16 there is shown a front elevation view showing a gripping attachment apparatus 1600 engaged with a handheld electronic device 1630 as described in connection with FIG. 5 with the gripping attachment apparatus shown in longitudinal cross-section.

According to the aspect shown in FIG. 16, the handheld electronic device 1630 may have a pair of opposing long sides 1632.

According to the aspect shown in FIG. 16, the elongated main body 1602 may comprise a contact side 1608 and an opposing gripping side 1610.

According to the aspect shown in FIG. 16, the gripping attachment apparatus 1600 may comprise a plurality of gripping grooves 1606

According to the aspect shown in FIG. 16, the handheld electronic device 1630 may include at least one control button 1646.

According to the aspect shown in FIG. 16, the gripping attachment apparatus 1600 may be configured so that at least one groove 1606 may be located over the control button 1634 when the handheld electronic device 1630 is received by the gripping attachment apparatus. It is an advantage of such aspects that the control button 1646 can be actuated when sufficient force is applied by a finger in the groove (not shown).

Referring to FIG. 17 there is shown a perspective view showing a gripping attachment apparatus 1700 according to an aspect of the invention may be releasably attached to an open edge 1750 of a bag 1752.

The gripping attachment apparatus 1700 may comprise an elongated main body 1702. The elongated main body may have any suitable length. For example, representative lengths of the elongated main body may be, without limitation, from about 2.5 inches up to about 6 inches, in some aspects from about 3 inches up to about 5.5 inches, and in some aspects from about 3.5 inches up to about 4.5 inches. In the aspect shown in FIG. 17, the elongated main body may have a length from about 3.5 inches up to about 4.5 inches. Representative heights may be, without limitation, from about 0.5 inches up to about 3 inches, in some aspects from about 1 inch up to about 2 inches, and in some aspects from about 1.5 inches up to about 1.75 inches. In the aspect shown in FIG. 17, the elongated main body may have a height of from about 1.0 inch up to about 2 inches. Representative widths may be, without limitation, from about 0.375 inch up to about 1 inch, in some aspects in some aspects, from about 0.25 inch up to about 0.075 inch, and in some aspects from about 0.375 inch up to about 0.5 inch. In the aspect shown in FIG. 17, the elongated main body may have a width of from about 0.25 inch up to about 0.75 inch.

According to the aspect shown in FIG. 17, the gripping attachment apparatus 1700 may comprise a pair of attachment sockets 1704 formed on the two ends 1714 of the elongated main body 1702.

According to the aspect shown in FIG. 17, the attachment socket 1704 may be dimensioned to receive the open edge 1750 of the bag 1752. For example, representative lengths of each end may be, without limitation, about from about 1.75 inches up to about 4 inches, in some aspects from about 2 inches up to about 3.5 inches, and in some aspects from about 2.5 inches up to about 3 inches. In the aspect shown in FIG. 1, the longitudinal groove may have a length from about 2.5 inches up to about 3 inches According to the aspect shown in FIG. 17, a longitudinal groove (not shown) may be formed having a length the same as the length of each of the ends.

According to the aspect shown in FIG. 17, a cross-section of each of the ends 1714 of the attachment socket 1704 may have any suitable shape configured to receive the open edge 1750 of the bag 1752. Examples include, without limitation, a tear shape, a semi-circle shape, a tunnel shape, or three sides of a square or rectangle such that the attachment socket 1704 may be adapted to handheld electronic devices with various sizes and thicknesses or external device cases with various sizes and thicknesses.

According to the aspect shown in FIG. 17, the gripping attachment apparatus 1700 may comprise a plurality of gripping grooves 1706 formed on the elongated main body 1702.

According to the aspect shown in FIG. 17, the elongated main body 1702 may comprise a gripping side 1710.

According to the aspect shown in FIG. 17, the two ends 1714 may be located opposite each other.

According to the aspect shown in FIG. 17, the gripping side 1710 may be located between the two ends 1714.

According to the aspect shown in FIG. 17, the plurality of gripping grooves 1706 may be formed on the gripping side 1710.

According to the aspect shown in FIG. 17, the plurality of gripping grooves 1706 may traverse into the gripping side 1710, between apices 1720.

According to the aspect shown in FIG. 17, the plurality of gripping grooves 1706 may be distributed between the two ends 1714.

According to the aspect shown in FIG. 17, the plurality of gripping grooves 1706 may be separate from each other along the gripping side 1710.

Referring to FIG. 18 there is shown a perspective view showing a pair of gripping attachment apparatuses 1800 according to an aspect of the present invention engaged with the rod portion 1860 of a weight set 1862.

The gripping attachment apparatus 1800 may comprise an elongated main body 1802. The elongated main body may have any suitable length. For example, representative lengths of the elongated main body may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the elongated main body may have a length from about 3.5 inches up to about 4.5 inches. Representative heights may be, without limitation, from about 0.5 inches up to about 3 inches, in some aspects from about 1 inch up to about 2 inches, and in some aspects from about 1.5 inches up to about 1.75 inches. In the aspect shown in FIG. 1, the elongated main body may have a height of from about 1.0 inch up to about 2 inches. Representative widths may be, without limitation, from about 0.375 inch up to about 1 inch, in some aspects in some aspects from about 0.25 inch up to about 0.75 inch and in some aspects from about 0.375 inch up to about 0.5 inch In the aspect shown in FIG. 1, the elongated main body may have a width of from about 0.25 inch up to about 0.75 inch.

According to the aspect shown in FIG. 18, the gripping attachment apparatus 1800 may comprise an attachment socket 1804 dimensioned to receive the rod portion 1860 of the weight set 1862. The rod portion may have a range of sizes and thicknesses. Representative diameters may be from about 1 inch up to about 3 inches, in some aspects from about 1.5 inch up to about 2.5 inch, and in some aspects at least 1.5 inches.

According to the aspect shown in FIG. 18, the attachment socket 1804 may have a longitudinal groove (not shown). Representative lengths of the longitudinal groove may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the longitudinal groove may have a length from about 3.5 inches up to about 4.5 inches According to the aspect shown in FIG. 18, a cross-section of the attachment socket 1804 may have any suitable shape configured to receive the rod portion 1860 of a weight set 1862 for use by a user 1838. Examples include, without limitation, a tear shape, a semi-circle shape, or a tunnel shape, such that the attachment socket 1804 may releasably receive the rod portion. According to the aspect shown in FIG. 18, the attachment socket 1804 may have a circular shape cross section with a diameter equal to the diameter of the rod portion 1860 of a weight set 1862.

According to the aspect shown in FIG. 18, the gripping attachment apparatus 1800 may comprise a plurality of gripping grooves 1806 formed on the gripping side 1810 of the elongated main body 1802.

According to the aspect shown in FIG. 18, the gripping grooves may have any suitable dimensions. In the aspect shown in FIG. 18, gripping grooves may have a semi-circular cross-section forming an arc having a diameter of from about 0.5 inch up to about 3 inches, in some aspects from about 1 inch up to about 2 inches, and in some aspects from about 1.5 inches up to about 2.75 inches.

According to the aspect shown in FIG. 18, the plurality of gripping grooves 1806 may be formed on the gripping side 1810.

Referring to FIG. 19 there is shown a perspective view showing a pair of gripping attachment apparatuses 1900 in accordance with an aspect of the invention engaged with a horizontal edge 1970 of a pan 1972.

According to the aspect shown in FIG. 19, each gripping attachment apparatus 1900 may be engaged using an attachment socket 1904 formed between two lateral sides 1912 (one shown) and dimensioned to receive the edge 1970 of the pan 1972. The edge of the pan may have any suitable cross-section including, without limitation, a semi-circle shape, a tunnel shape, or three sides of a square or rectangle. In the aspect shown in FIG. 19, the cross-section of the edge includes three sides of a rectangle.

According to the aspect shown in FIG. 19, representative lengths of the edge 1970 of the pan 1972 may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the elongated main body may have a length from about 3.5 inches up to about 4.5 inches. Representative widths may be, without limitation, about 0.5 inch up to about 2.5 inches, and in some aspects from about 1 inch up to about 2 inches. In the aspect shown in FIG. 19, the edge of the pan may have a width of at least 1 inch Representative thicknesses may be, without limitation, about 0.375 inch up to about 1 inch. In the aspects shown in FIG. 19, the elongated main body may have a height of at least about 0.5 inch.

According to the aspect shown in FIG. 19, the length, and dimensions of the attachment socket 1904 are chosen so that the attachment socket may releasably receive the edge 1970 of the pan 1972. Representative lengths of the attachment socket may be, without limitation, from about 2.5 inches up to about 6 inches, in some aspects from about 3 inches up to about 5.5 inches, and in some aspects from about 3.5 inches up to about 4.5 inches. In the aspect shown in FIG. 1, the attachment socket may have a length from about 3.5 inches up to about 4.5 inches. Representative widths may be, without limitation, about 0.5 inch up to about 2.5 inches, and in some aspects from about 1 inch up to about 2 inches. In the aspect shown in FIG. 19, the attachment socket may have a width of at least 1 inch. Representative thicknesses may be, without limitation, about 0.375 inch up to about 1 inch, and in the aspects shown in FIG. 19, the elongated main body may have a height of at least about 0.5 inch.

According to the aspect shown in FIG. 19, the gripping attachment apparatus 200 may comprise a plurality of gripping grooves 1906. In some aspects, the gripping grooves 106 may have a semi-circular or tunnel-shaped cross-section. In the aspect shown in FIG. 19, gripping grooves may have a semi-circular cross-section forming an arc having a diameter of from about 0.5 inch up to about 3 inches, in some aspects from about 1 inch up to about 2 inches, and in some aspects from about 1.5 inches up to about 2.75 inches.

According to the aspect shown in FIG. 19, the plurality of gripping grooves 1906 may be formed on the elongated main body 1902.

According to the aspect shown in FIG. 19, the attachment socket 1904 and the plurality of gripping grooves 1906 may be located opposite to each other about the elongated main body 1902.

According to the aspect shown in FIG. 19, the elongated main body 1902 may comprise a contact side 1908 having a contact surface 1918.

According to the aspect shown in FIG. 19, the contact side 1908 may be flat.

According to the aspect shown in FIG. 19, the elongated main body 1902 may comprise a gripping side 1910 having a gripping surface 1916.

According to the aspect shown in FIG. 19, the elongated main body 1902 may comprise two lateral sides 1912 (one shown).

According to the aspect shown in FIG. 19, the two lateral sides 1912 may be flat.

According to the aspect shown in FIG. 19, the elongated main body 1902 may comprise two ends 1914.

According to the aspect shown in FIG. 19, both ends are flat.

According to the aspect shown in FIG. 19, the contact side 1908 and the gripping side 1910 may be located opposite each other.

According to the aspect shown in FIG. 19, the two lateral sides 1912 may be located opposite each other.

According to the aspect shown in FIG. 19, the two ends 1914 may be located opposite each other.

According to the aspect shown in FIG. 19, the contact side 1908 and the gripping side 1910 may be located between the two ends 1914.

According to the aspect shown in FIG. 19, the two lateral sides 1912 may be located between the two ends 1914.

According to the aspect shown in FIG. 19, the contact side 1908 and the gripping side 1910 may be located between the two lateral sides 1912.

According to the aspect shown in FIG. 19, the attachment socket 1904 may be formed on the contact side 1908.

According to the aspect shown in FIG. 19, the attachment socket 1904 may traverse into the contact side 1908.

According to the aspect shown in FIG. 19, the attachment socket 1904 may extend between the two ends 214.

According to the aspect shown in FIG. 19, the attachment socket 1904 may traverse through the two ends 1914.

According to the aspect shown in FIG. 19, the plurality of gripping grooves 1906 may be formed on the gripping side 1910.

According to the aspect shown in FIG. 19, the plurality of gripping grooves 1906 may traverse into the gripping side 1910, between apices 1920.

According to the aspect shown in FIG. 19, the plurality of gripping grooves 1906 may be distributed between the two ends 1914.

According to the aspect shown in FIG. 19, the plurality of gripping grooves 1906 may be separate from each other along the gripping side 1910.

Referring to FIG. 20 there is shown a perspective view showing a pair of gripping attachment apparatuses 2000 according to the aspect as described in connection with FIG. 18 engaged with a handle 2080 of a shopping cart 2082.

According to the aspect shown in FIG. 20, the gripping attachment apparatus 2000 may be engaged using an attachment socket 2004 formed between two lateral sides 2012 (one shown) and dimensioned to receive the handle 2080 of the shopping cart 2082.

According to the aspect shown in FIG. 20, the gripping grooves 2006 may have a circular shape cross section with a diameter equal to the diameter of the handle 2080 of the shopping cart 2082.

Referring to FIG. 21 there is shown a perspective view showing a pair of gripping attachment apparatuses 2100 according to the aspect as described in connection with FIG. 5 FIG. 18 engaged with a handle 2190 of a broom 2192.

According to the aspect shown in FIG. 21, the gripping attachment apparatus 2100 may be engaged using an attachment socket 2104 formed between two lateral sides 2012 (one shown) and dimensioned to receive the handle 2190 of a broom 2192.

According to the aspect shown in FIG. 21, the attachment socket 2104 may have a cross-section corresponding to the shape of the handle 2190 of the broom 2192.

Since many modifications, variations, and changes in detail can be made to the described preferred aspects of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A gripping attachment apparatus for gripping an item having an attachment surface, the gripping attachment apparatus comprising:

an elongated main body;

an attachment socket;

a plurality of gripping grooves;

the attachment socket being formed on the elongated main body;

the plurality of gripping grooves being formed on the elongated main body;

the attachment socket and the plurality of gripping grooves being located opposite to each other about the elongated main body;

the attachment socket being configured to receive the attachment surface; and the plurality of gripping grooves being configured to receive fingers of a left hand or a right hand of a user.

2. The gripping attachment apparatus in accordance with claim 1 wherein the attachment socket is configured to releasably receive the attachment surface.

3. The gripping attachment apparatus in accordance with claim 2 wherein the attachment socket is configured to releasably receive the item using a slide fit, a friction fit, or a fit snap fit.

4. The gripping attachment apparatus in accordance with claim 1 wherein the attachment socket has a cross-section that is a tear shape, a semi-circle shape, a tunnel shape, or three sides of a square or rectangle.

5. The gripping attachment apparatus in accordance with claim 1 wherein the attachment socket is configured to receive an edge attachment surface or a rod attachment surface.

6. The gripping attachment apparatus in accordance with claim 5 wherein the attachment socket is configured to receive an edge of a handheld electronic device with or without an external device case surrounding the handheld electronic device, an edge of a computer, the edge of a bag, utensils, an edge of a dish, an edge of a pot or an edge of a pan.

7. The gripping attachment apparatus in accordance with claim 5 wherein the rod is a handle of a shopping cart, a handle of a broom, a handle of a mop, or a rod portion of a weight set.

8. The gripping attachment apparatus in accordance with claim 1 wherein the elongated main body is made of a phosphorescent silicone material.

9. The apparatus of claim 1 wherein the elongated main body has two opposing ends and the opposing ends independently have a straight, curved, or chamfered shape.

10. A gripping attachment apparatus for a handheld electronic device with or without an external device case surrounding the handheld electronic device, the gripping attachment apparatus comprising:

an elongated main body;

an attachment socket;

a plurality of gripping grooves;

the attachment socket being formed on the elongated main body;

the plurality of gripping grooves being formed on the elongated main body;

the attachment socket and the plurality of gripping grooves being located opposite to each other about the elongated main body;

the attachment socket being configured to slidably receive the handheld electronic device or the external device case surrounding the handheld electronic device; and the plurality of gripping grooves being configured to receive fingers of a left hand or a right hand of a user.

11. The gripping attachment apparatus in accordance with claim 10 wherein the attachment socket is configured to releasably receive the item.

12. The gripping attachment apparatus in accordance with claim 10 wherein the attachment socket is configured to releasably receive the item using a slide fit, a friction fit, or a fit snap fit.

13. The gripping attachment apparatus in accordance with claim 10 wherein the attachment socket has a cross-section that is a tear shape, a semi-circle shape, a tunnel shape, or three sides of a square or rectangle.

14. The gripping attachment apparatus in accordance with claim 10 wherein the attachment socket is configured to receive an edge attachment surface or a rod attachment surface.

15. The gripping attachment apparatus in accordance with claim 14 wherein the attachment socket is configured to receive an edge of a handheld electronic device with or without an external device case surrounding the handheld electronic device, the edge of a computer, a bag, utensils a dish, a pan, or a pot.

16. The gripping attachment apparatus in accordance with claim 10 wherein the rod is a handle of a shopping cart, a handle of a broom, a handle of a mop, or a rod portion of a weight set.

17. The gripping attachment apparatus in accordance with claim 10 wherein the elongated main body is made of a phosphorescent silicone material.

18. The gripping attachment apparatus in accordance with claim 10 wherein the elongated main body has two opposing ends and the opposing ends independently have a straight, curved, or chamfered shape.

19. An apparatus for receiving an item having an attachment surface, the apparatus comprising:

an elongated main body;

an attachment socket;

a plurality of grooves;

the attachment socket being formed on the elongated main body;

the plurality of grooves being formed on the elongated main body;

the attachment socket and the plurality of grooves being located opposite to each other about the elongated main body; and the attachment socket being configured to receive the attachment surface.

20. The gripping attachment apparatus in accordance with claim 19 wherein the attachment socket is configured to releasably receive the attachment surface.

* * * * *